(12) United States Patent
Nurminen et al.

(10) Patent No.: US 7,551,570 B2
(45) Date of Patent: Jun. 23, 2009

(54) SYSTEM AND METHOD FOR DATA HANDLING A NETWORK ENVIRONMENT

(75) Inventors: Jukka K. Nurminen, Espoo (FI); Balázs Bakos, Törökbálint (HU); Lóránt Farkas, Budapest (HU); Kálmán Marossy, Kazincbarcika (HU)

(73) Assignee: Nokia Corporation, Espoo (FI)

( * ) Notice: Subject to any disclaimer, the term of this patent is extended or adjusted under 35 U.S.C. 154(b) by 947 days.

(21) Appl. No.: 10/697,622

(22) Filed: Oct. 29, 2003

(65) Prior Publication Data

US 2005/0068901 A1    Mar. 31, 2005

Related U.S. Application Data

(63) Continuation-in-part of application No. 10/674,679, filed on Sep. 29, 2003.

(51) Int. Cl.
*H04L 12/28* (2006.01)

(52) U.S. Cl. .................................................. 370/254

(58) Field of Classification Search ................ 370/252, 370/389, 401, 409, 254; 709/221, 238
See application file for complete search history.

(56) References Cited

U.S. PATENT DOCUMENTS

| | | | |
|---|---|---|---|
| 6,779,039 B1 * | 8/2004 | Bommareddy et al. | 709/238 |
| 2002/0129086 A1 * | 9/2002 | Garcia-Luna-Aceves et al. | 709/200 |
| 2003/0110181 A1 * | 6/2003 | Schuetze et al. | 707/103 R |

OTHER PUBLICATIONS http://opennap.sourceforge.net/napster.txt, printed Feb. 12, 2004.
The Gnutella Protocol Specification v0.4, document revision 1.2, http://www9.limewire.com/developer/gnutella_protocol_0.4.pdf, printed Feb. 12, 2004.
Schmidt, R., "Gridella: An open and efficient Gnutella compatible Peer-to-peer system based on the p-grid approach," Chapter 2.1, http://avalon.aut.bme.hu/~coloman/docs/p-grid_docs.pdf , printed Feb. 12, 2004.
Aberer, K., Hauswirth, M., Punceva, M.: "Self-organized construction of distributed access structures: A comparative evaluation of P-Grid and FreeNet", http://avalon.aut.bme.hu/~coloman/docs/P-grid_Freenet_compare.pdf, printed Feb. 12, 2004.
Dabek, F., Brunskill, E., Kaashoek, M.F., David, K., Morris, R., Sotica, I., Balakrishnan, H: "Building Peer-to-Peer Systems With Chord, a Distributed Lookup Service", http://avalon.aut.bme.hu/~coloman/docs/Chord.pdf, printed Feb. 12, 2004.

(Continued)

*Primary Examiner*—Kevin C Harper
*Assistant Examiner*—Wanda Z Russell
(74) *Attorney, Agent, or Firm*—Locke Lord Bissell & Liddell LLP

(57) ABSTRACT

Systems and methods employable, for example, in performing various operations in a network environment (e.g., a peer-to-peer environment). Such operations can include, for example, searching for downloadable entities, conveying information regarding available entities, conveying information regarding nodes, handling node registration, handling node deregistration, handling node deactivation, handling node activation, performing reclustering, and/or the like.

18 Claims, 23 Drawing Sheets

OTHER PUBLICATIONS

Kwangwook Shin, Seunghak Lee, Geunhwi Lim, H.Yoon, Joong Soo Ma: "Grapes: Topology-based Hierarchical Virtual Network for Peer-to-peer Lookup Services", http://avalon.aut.bme.hu/~coloman/docs/grapes.pdf, printed Feb. 12, 2004.

Gold R., Tidhar, D: "Towards a Content-based Aggregation Network", http://avalon.aut.bme.hu/~coloman/docs/contentbasedaggregationnetwork.pdf, printed Feb. 12, 2004.

Lindenmann, C., Waldhorst, O.P.: "A Distributed Search Service for Peer-to-Peer File Sharing in Mobile Applications", http://avalon.aut.bme.hu/~coloman/docs/PDI.pdf, printed Feb. 12, 2004.

Kortuem, G., Schneider, J., Preuitt, D., Thompson, T.G. C., Fickas, S., Segall, Z.: "When Peer-to-Peer comes Face-to-Face: Collaborative Peer-to-peer computing in Mobile Ad hoc Networks", http://avalon.aut.bme.hu/~coloman/docs/proem.pdf, printed Feb. 12, 2004.

Hung-Chang Hsiao Chung-Ta King: "Modeling and Evaluating Peer-to-Peer Storage Architectures", http://avalon.aut.bme.hu/~coloman/docs/oceanstore.pdf, printed Feb. 12, 2004.

Traversat, B., Abdelaziz, M, Duigou, M., Hugly, J-C., Pouyoul, E., Yeaher B.: "Project JXTA Virtual Network", http://avalon.aut.bme.hu/~coloman/docs/JXTAprotocols.pdf, printed Feb. 12, 2004.

Proceedings of Association for Computing Machinery (ACM) Annual Conference of the Special Interest Group on Data Communications (SIGCOMM), Pittsburgh, USA, Aug. 19-23, 2002, "Modeling and Measuring Scalable peer-to-peer search networks—Extended version", Cooper, Garcia-Molina.

Neil, Garcia-Molina, Yang, "Open problems in data sharing peer-to-peer systems", http://dbpubs.stanford.edu:8090/aux/index-en.html, printed Feb. 12, 2004.

Cooper, Garcia-Molina, "SIL—Modeling and Measuring Scalable peer-to-peer search networks", http://dbpubs.stanford.edu/pub/2003, printed Feb. 12, 2004.

* cited by examiner

SYSTEM AND METHOD FOR DATA HANDLING A NETWORK ENVIRONMENT

This application is a continuation-in-part of U.S. application Ser. No. 10/674,679 entitled "System and Method for Data Handling in a Network Environment", filed Sep. 29, 2003 and incorporated herein by reference.

FIELD OF INVENTION

This invention relates to systems and methods for data handling.

BACKGROUND INFORMATION

In recent years, there has been an increase in the use of computers, such as mobile nodes, for network-based operations. For example, there has been an increase in the use of such computers in sharing entities such as, for example, images, video clips, audio recordings, and the like.

Many individuals have come to prefer entity sharing to conventional venues for receiving content such as record stores, software stores, radio, television, and movie theaters. Moreover, such computers increasingly provide functionality whereby users can create and edit such entities by themselves. In many cases, users would like to share their creations with other individuals via entity sharing technologies.

Accordingly, there may be interest in technologies that facilitate such use of computers.

SUMMARY OF THE INVENTION

According to various embodiments of the present invention, there are provided systems and methods employable, for example, in performing various operations in a network environment. Such a network environment could, for instance, be a peer-to-peer environment.

Such operations can include, for example, searching for downloadable entities, conveying information regarding available entities, conveying information regarding nodes, handling node registration, handling node deregistration, handling node deactivation, handling node activation, performing reclustering, and/or the like.

DETAILED DESCRIPTION OF THE INVENTION

General Operation

According to various embodiments of the present invention, there are provided systems and methods employable, for example, in performing various operations in a network environment. Such a network environment could, for instance, be a peer-to-peer environment.

Such operations can include, for example, searching for downloadable entities, conveying information regarding available entities, conveying information regarding nodes, handling node registration, handling node deregistration, handling node deactivation, handling node activation performing reclustering, and/or the like.

Figure 1:
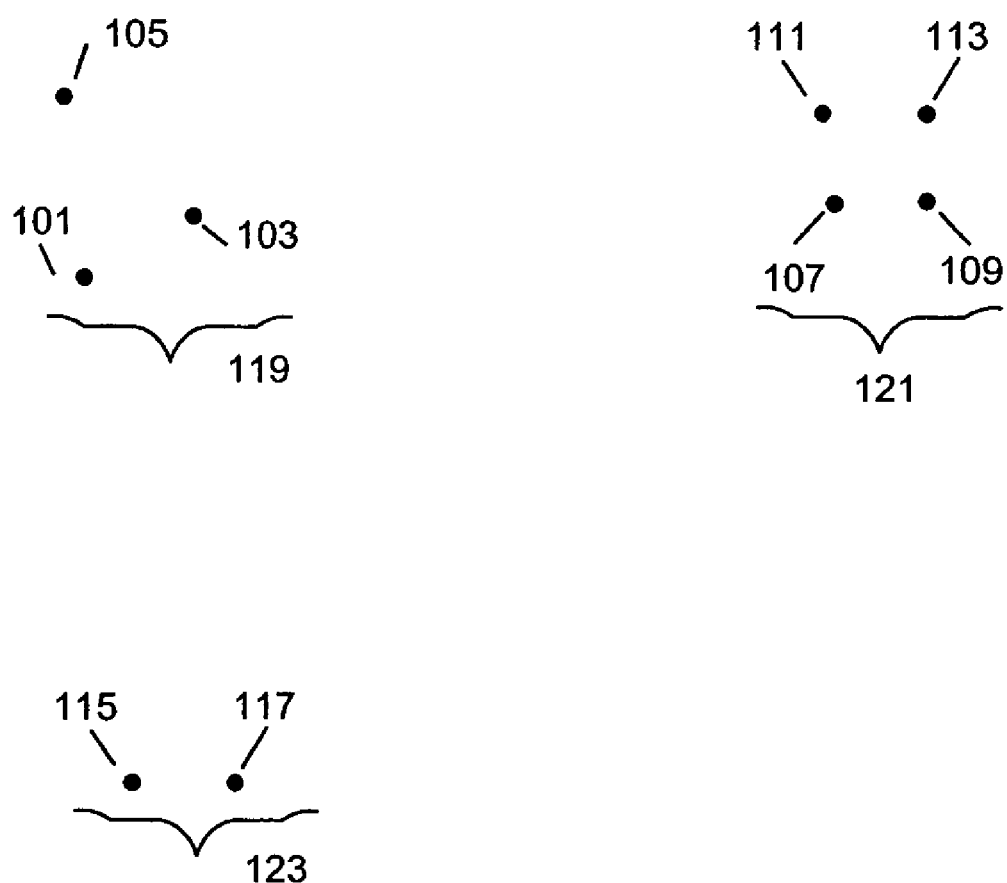
FIG. 1 is a diagram depicting an exemplary network environment according to various embodiments of the present invention.

Network environment organization can, in various embodiments, be such that nodes are organized into clusters. Shown in FIG. 1. is an exemplary network environment wherein there are three clusters (1001-1005). As seen in FIG. 1, exemplary cluster 119 is made up of nodes 101-105, exemplary cluster 121 is made up of nodes 107-113, and exemplary cluster 123 is made up of nodes 115 and 117.

Various aspects of the present invention will now be discussed in greater detail.

Registration

Figure 2:
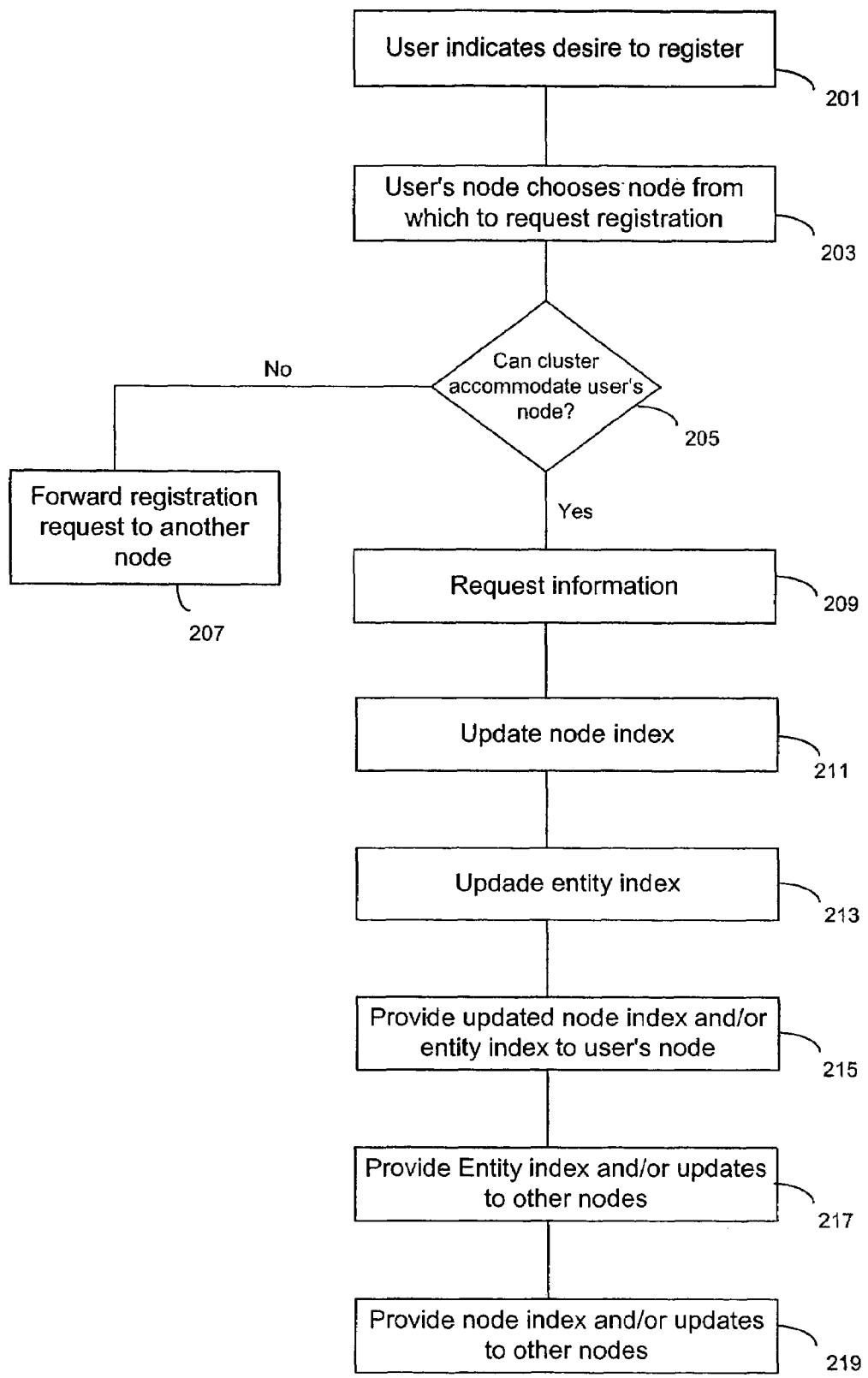
FIG. 2 is a diagram depicting exemplary steps involved in registration according to various embodiments of the present invention.

According to various embodiments of the present invention a user may act to register his node with a cluster in a network environment (e.g., a peer-to-peer environment). With reference to FIG. 2 it is noted that the user might indicate a desire to register, for instance, via a graphical user interface (GUI) or other interface provided by his node (step 201).

It is noted that, in various embodiments, the user might, perhaps via a GUI or other interfaced provided by his node, additionally specify a cluster with which he sought to register his node. Responsive to the user's indication of a desire to register, the node could act to choose a node, already registered in the network environment, from which to request registration (step 203). The node could know of already-registered nodes in a number of ways.

For example, in various embodiments of the present invention, the user might, perhaps via a GUI or the like provided by his node, act to impart to his node information corresponding to one or more already-registered nodes. The user might do so, for example, at the time of requesting registration of his node. As another example, the user's node might, perhaps via a GUI or the like, query the user for such information.

The user could provide the information for a particular already-registered node, for instance, in the form of a network address or the like. In various embodiments, among the information provided by the user regarding a particular already-registered node could be an indication of the cluster with which that node was associated.

As another example, the user's node could, alternately or additionally, know of such information for one or more already-registered nodes by way of having received the information during its manufacture, via a customer service kiosk, from another node via a data link, from a sever (e.g., a web server), and/or the like.

Such information might be received at time of manufacture or at a kiosk, for instance, by an employee manually entering the information via a GUI or other interface provided by the node, and/or by the data being loaded on via a data link. Data links in employed in receiving the information from another node, at time of manufacture, or at a kiosk could include, for instance, Bluetooth, Universal Serial Bus (USB), FireWire, infrared data association (IrDA), Ethernet, serial connection, and/or the like.

As yet another example, the user's node could, alternately or additionally, know of such information by way of data received from one or mode nodes found via a device discovery operation known in the art such as Bluetooth device discovery or the like. In various embodiments, in the case where the user's node was aware of information relating to more than one already-registered node, the node might perform one or more operations in order to determine which of the nodes it should contact in order to request registration. For instance, in the case where the user has specified a desired cluster, his node could preferentially choose an already-registered node that was associated with the specified cluster.

It is noted that, in various embodiments, in the case where the user's node is aware of more than one already-registered node and has chosen one of those nodes for contact, but the user's node is unable to contact the chosen node, the user's node might act to, one by one, attempt to employ others of the known already-registered nodes until successful contact was made.

According to various embodiments of the present invention, various techniques could be employed by the user's node in contacting a chosen already-registered node in order to request registration. For example, appropriate data could be dispatched to the chosen node via one or more packets, the packets perhaps being directed to a network address or the like associated with the chosen node, Transmission Control Protocol (TCP), User Datagram Protocol (UDP), and/or the like could perhaps being employed in the dispatch. Where UDP is employed, one or more techniques may be employed to ensure receipt of the data. For instance, receipt acknowledgment of dispatched packets might be sought.

In various embodiments, file transfer protocol (FTP), hypertext transfer protocol (HTTP), simple object access protocol (SOAP), remote method invocation (RMI), Java messaging service (JMS), short message service (SMS), multimedia messaging service (MMS), and/or the like might be employed. In various embodiments, in the case where the user specified a desired cluster, among the data dispatched to the chosen already-registered node could be indication of the desired cluster.

In the case where the user did not specify a desired cluster, or where the chosen already-registered was associated with the desired cluster, the chosen already-registered node could act to decide if the cluster with which it was associated could accommodate the user's node (step 205). The already-registered node could make such a decision in a number of ways. For instance, the already-registered node might take the size of the cluster into account in making the decision. For example, the already-registered node might allow entry of the user's node into the cluster in the case where the cluster was below the average cluster size for the network environment.

In various embodiments, held at each registered node is a Node Index (NI) holding various data relating to registered nodes in the network environment including, for instance, indication of the clusters with which nodes in the network environment are associated, indication of whether particular nodes in the network environment are active, indication of identifiers for nodes in the network environment, indication of network addresses or the like for nodes in the network environment, quantities of downloadable entities being made available by nodes in the network environment, transfer rates enjoyed by nodes in the network environment, indication of last dates of change in activity status for nodes in the network environment, indication of networks (e.g., Bluetooth, 802.11b, 802.11g, Universal Mobile Telecommunications System (UMTS), and/or wired networks) by which nodes in the network environment were reachable, and/or the like.

The already-registered node could, for example, employ the NI in determining if its cluster was below the average cluster size. The node could do so, for instance, by consulting the NI to learn of the number of nodes associated with each cluster, computing average cluster size, and comparing the size of its cluster to the average cluster size.

As another example, the already-registered node might allow entry of the user's node into the cluster in the case where the cluster's size was below an ideal cluster size. Such an ideal cluster size might be indicated by a system administrator and/or the like. Alternately or additionally, such an ideal cluster size might be computed by one or more nodes in the network environment, the computation perhaps taking into account factors such as traffic levels. Various aspects of traffic monitoring will be discussed in greater detail below.

In the case where the already-registered node determined that the user's node could be allowed entry into the cluster, a number of operations could be performed. In the case where already-registered node determined that the user's node could not be allowed into the cluster, the already registered node could act to forward the registration request to an online already-registered node in another cluster (steps 205, 207). Forwarding of the request could, for example, be performed in a manner analogous to that discussed above with respect to dispatch of the registration request from the user's node.

Various techniques could be employed in choosing the node to be forwarded the registration request. For example, where the already-registered node selected by the user's node, as discussed above, determined that its cluster size was not below the average cluster size for the network environment, the node could act to have the registration request forwarded to an online node in a cluster whose size was below the average cluster size. The NI could, in various embodiments, be employed in performing such operations.

In various embodiments, in the case where the already-registered node chosen by the user's node determined that there were no online nodes in other clusters, the already-registered node might, despite its previous decision to the contrary, act to allow into its cluster the user's node. As is discussed in greater detail below, in various embodiments reclustering operations are performed whereby, for instance, a node may be transferred from one cluster to another. Accordingly, such reclustering operations might act to, for instance, correct any cluster imbalance caused by such an acceptance of the user's node after a decision to the contrary.

It is noted that, in various embodiments, in the case where the user has specified a desired cluster, but the already-registered node chosen by the user's node is not associated with that cluster, the chosen already-registered node could act to forward the registration request to an online node associated with the desired cluster. The forwarding could, for example, be done in a manner analogous to that discussed above.

The already-registered node chosen by the already-registered node chosen by the user's node could choose the node to which to forward the request in a number of ways. For example, the user's node could consult its NI to find a node that was both online and associated with the desired cluster.

In the case where there was no node associated with the desired cluster that was online, the already-registered node chosen by the user's node could act in the manner discussed above with regard to a already-registered node receiving a registration request in the situation where the user did not specify a desired cluster. Upon receipt of a forwarded registration request, a recipient already-registered node could act in a manner analogous to that discussed above with respect to receipt of the registration request by the already-registered node selected by the user's node.

As noted above, a number of operations may be performed in the case where the user's node is accepted into a cluster. Among the operations could, in various embodiments, be dispatch of data between the user's node and the already-registered node. Such dispatch could, for instance, be performed in a manner analogous to that discussed above with respect to the user's node communicating with a chosen node to request registration.

In accepting the user's node, in various embodiments the already-registered node that has accepted the user's node might act, for instance, to inform the user's node that it has been accepted into a cluster, the notification perhaps including indication of that cluster. Further, the already-registered node might request various information regarding the node, and/or might request various information regarding downloadable entities that the node is making available (step 209). Such entities could, for example, include music, video, pictures, software, written documents, and/or the like. In various embodiments, a user could, for example, specify the entities that he wished his node to make available by employing a GUI or the like. For example, the user might employ a file browser whereby he could select the entities stored on his node that he wished to share.

As alluded to above, held at the already-registered node in various embodiments is a NI. The already-registered node could, in various embodiments, employ received information regarding the user's node to update its held NI. Moreover, the already-registered node could, in various embodiments, act to update its NI to indicate that the user's node is a registered node (step 211). Among the information added to the NI regarding the user's node could be, in various embodiments, an indication that the user's node is online, a network address associated with the user's node, an indication of the cluster with which the user's node is associated, a numerical identifier corresponding to the node, and/or the like.

It is further noted that held by registered nodes according to various embodiments of the present invention is an Entity Index (EI). Stored in the EI held by a registered node may be, for example, data relating to the entities being made available by nodes in the registered node's cluster. As noted above, in various embodiments the already-registered node could receive from the user's node information regarding the downloadable entities the node is making available. Accordingly, in various embodiments, the already-registered node could act to update its EI in light of the received information (step 213).

As a further step in accepting the user's node into the cluster the already-registered node could, in various embodiments, provide a copy of its updated NI and/or EI to the user's node (step 215). In accepting the user's node into the cluster the already-registered node could, in various embodiments, additionally provide for receipt by each of the other nodes in its cluster the updated EI (step 217). In certain embodiments, the already-registered node might provide the entire updated EI for receipt, while in other embodiments only the changes to the EI might be made available. Moreover, in various embodiments a decision could be made as to whether the entire updated EI or changes thereto would be made available. Such a decision might, for example, take into account EI size.

The EI and/or updates thereto could be made available to the other nodes in the cluster, for instance, via an intra-cluster distribution technique of the sort discussed later herein.

Further, in various embodiments the already-registered node could provide for receipt by each node in each cluster in the network environment the updated NI (step 219). In certain embodiments, the already-registered node could provide the entire updated NI for receipt, while in other embodiments only the changes to the NI might be made available. Moreover, in various embodiments a decision could be made as to whether the entire updated NI or changes thereto would be made available. Such a decision might, for example, take into account NI size.

The entire updated NI and/or the changes thereto could be made available in a number of ways. For instance, the already-registered node could make the corresponding data available to a single active node in each other cluster in the network environment via an inter-cluster distribution technique of the sort discussed later herein. The recipient node in each cluster could, in turn, make the corresponding data available to the other nodes in its cluster, for example, via an intra-cluster distribution technique of the sort discussed later herein.

Deregistration

According to various embodiments of the invention, a node that has previously registered in a network environment (e.g., a peer-to-peer environment) may act to deregister from that environment. A registered node might act to do so, for instance, in response to a corresponding request from its user, the request perhaps submitted by the user via a GUI or other interface provided by the node.

Figure 3:
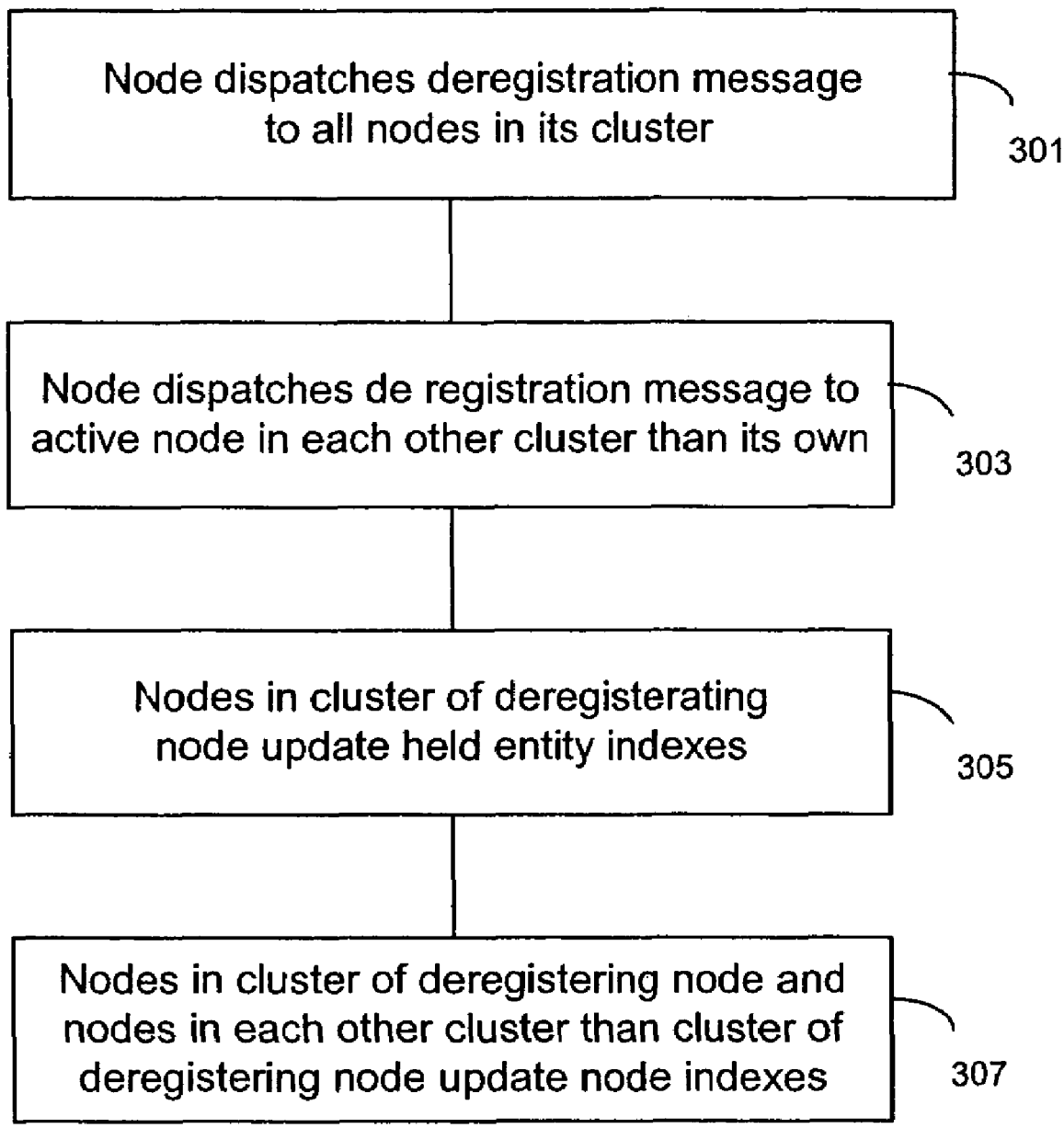
FIG. 3 is a diagram depicting exemplary steps involved in deregistration according to various embodiments of the present invention.

With reference to FIG. 3 it is noted that, in seeking to deregister, a registered node might, for example, dispatch a corresponding deregistration message to all nodes in its cluster using, for instance, an intra-cluster distribution technique of the sort discussed later herein (step 301). Further, the node could, for instance, dispatch the deregistration message to a single active node in each cluster other than its own in the network environment (step 303). Dispatch could, for example, be via an inter-cluster distribution technique of the sort discussed later herein. The recipient node in each other cluster could, in turn, forward the deregistration message to the other nodes in its cluster using, for instance, an intra-cluster distribution technique of the sort discussed later herein.

Among the data included in the message could be, for instance, one or more network addresses, identifiers, and/or the like corresponding to the deregistering node. A node receiving a deregistration message could, in various embodiments, act to appropriately update, for instance, its held NI and/or EI. Accordingly each recipient node in the cluster of the deregistering node could, for example, delete from its EI indications of the downloadable entities that were being made available by the deregistering node (step 305).

Moreover, each recipient node in the cluster of the deregistering node and each recipient node in each other cluster could, for example delete from its NI data corresponding to the deregistering node. It is noted that, in various embodiments, rather than deleting from its NI and/or EI such data corresponding to the deregistering node, a node receiving the deregistration message could keep some or all of such data, but add to the NI and/or EI one or more annotations corresponding to the deregistration.

In various embodiments, held NI and/or EI data corresponding to a node that deregistered could be used in a number of ways including, for instance, reclustering, determination of popular downloadable entities, and/or the like.

Deactivation

A registered node, in various embodiments of the present invention, may be able to perform deactivation operations in order to temporarily cease its participation with the clusters of a network environment (e.g., a peer-to-peer environment). The node might perform deactivation, for instance, in response to a request for deactivation submitted by its user via a provided GUI or other interface, its user instructing the node to power down (e.g., by pressing a power button on the node while the node is powered-up), and/or the like.

Figure 4:
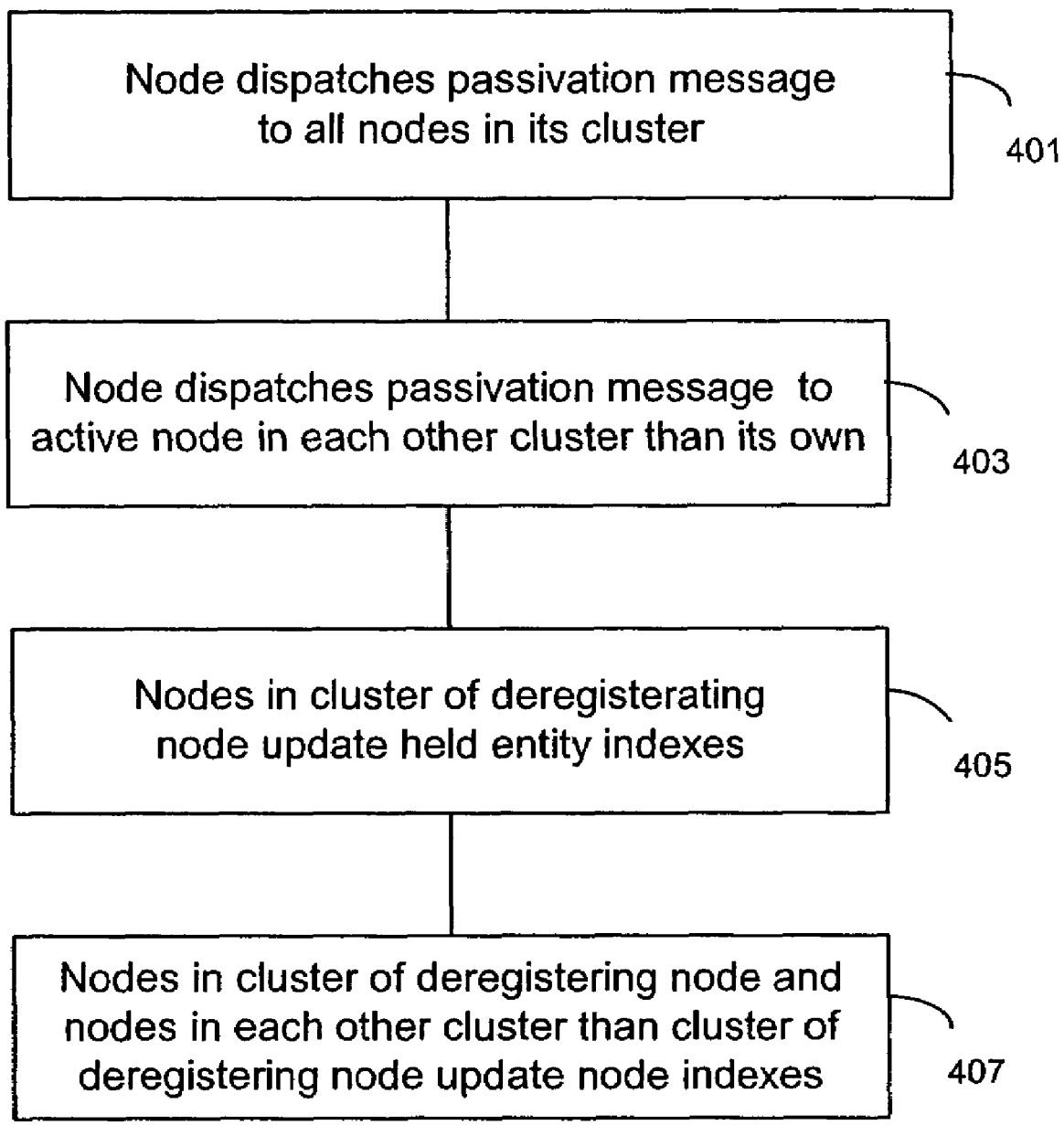
FIG. 4 is a diagram depicting exemplary steps involved in deactivation according to various embodiments of the present invention.

With reference to FIG. 4 it is noted that, in acting to deactivate, the node might, for instance, dispatch a corresponding deactivation message to all nodes in its cluster using, for instance, an intra-cluster distribution technique of the sort discussed later herein (step 401). Further, the node could, for instance, dispatch the deactivation message to a single active node in each cluster other than its own in the network environment (step 403). Dispatch could, for example, be via an inter-cluster distribution technique of the sort discussed later herein. The recipient node in each other cluster could, in turn, forward the deactivation message to the other nodes in its cluster using, for instance, an intra-cluster distribution technique of the sort discussed later herein.

Among the data included in the message could be, for instance, one or more network addresses, identifiers, and/or the like corresponding to the deactivating node. A node receiving a deactivation message could, in various embodiments, act to appropriately update, for instance, its held NI and/or EI.

Accordingly each recipient node in the cluster of the deactivating node could, for example, annotate the entries in its EI corresponding to the downloadable entities that were being made available by the deactivating node to reflect the deactivation event (step 405). Included in the annotation might, in various embodiments, be data corresponding to the time and/or date of deactivation. As another example, each recipient node in the cluster of the deactivating node could delete from its EI indications of the downloadable entities that were being made available by the deactivating node.

Moreover, each recipient node in the cluster of the deactivating node and each recipient node in each other cluster could, for example annotate its NI to reflect the deactivation (step 407). As another example, each recipient node in the cluster of the deactivating node and each recipient node in each other cluster could delete from its NI data corresponding to the deactivating node.

Activation

According to various embodiments of the present invention, a node that has deactivated itself may be able to perform activation operations in order to resume its participation with the clusters of a network environment (e.g., a peer-to-peer environment). The node might perform activation, for instance, in response to a request for activation submitted by its user via a provided GUI or other interface, its user instructing the node to power up (e.g., by pressing a power button on the node while the node is in a powered-down state), and/or the like.

Figure 5:
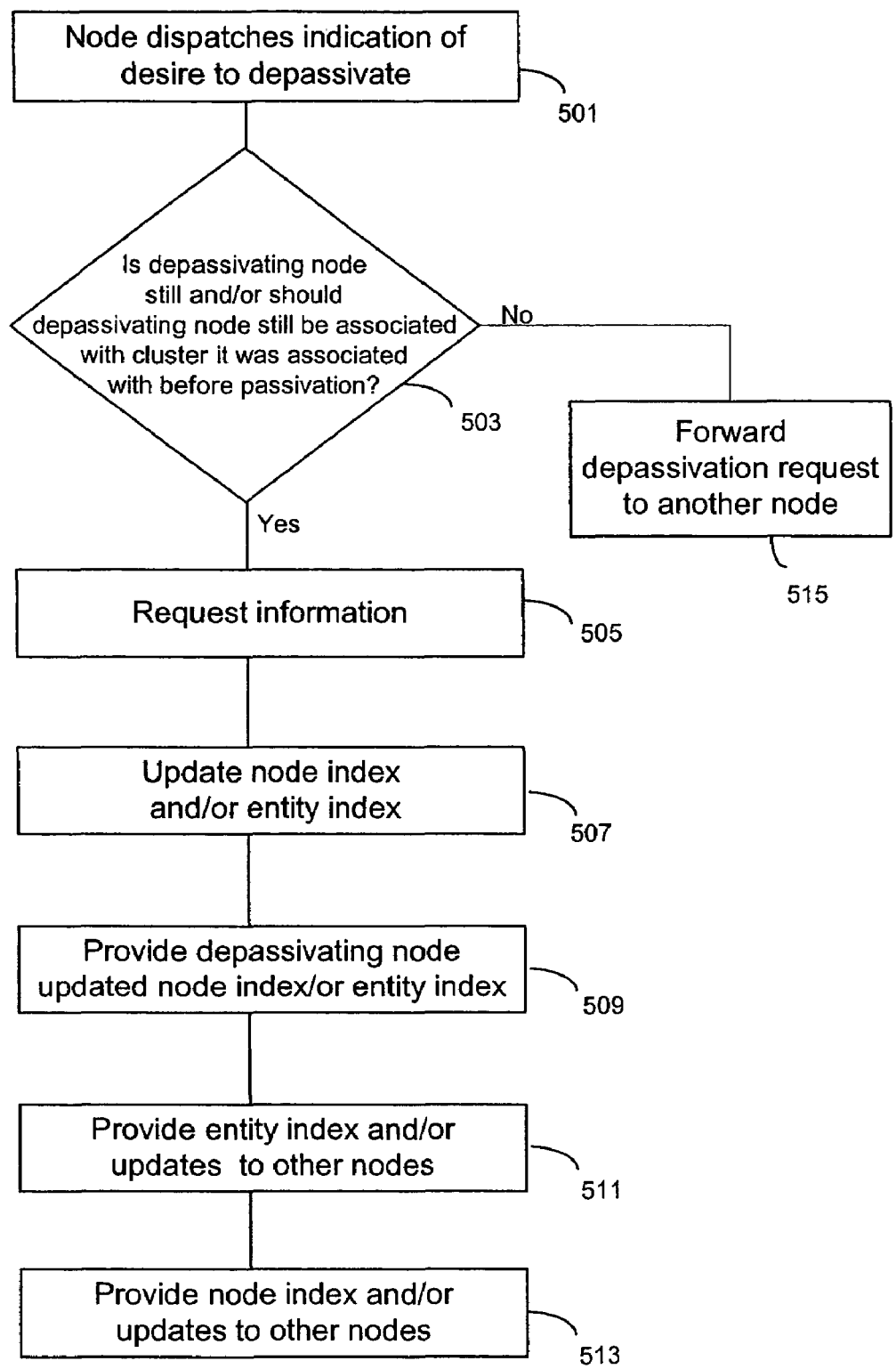
FIG. 5 is a diagram depicting exemplary steps involved in activation according to various embodiments of the present invention.

With respect to FIG. 5 it is noted that, in performing activation, a node might, for instance, consult its held NI to find a network address or the like of a node indicated to be associated with the cluster with which the activating node was associated before deactivation. The activating node could then dispatch to the found network address or the like an indication of desire to activate (step 501).

It is noted that, in various embodiments, in the case where the NI contains information regarding multiple nodes indicated to be associated with the cluster with which the activating node was associated before deactivation, and the activating node was unable to successfully contact one of such nodes it selected, the activating node might act to, one by one, try each other such node until successful contact was made.

As is discussed in greater detail below, in various embodiments situations may arise whereby a node that has deactivated is transferred during its deactivation to a cluster other than the one with which it was associated before deactivation. As is also discussed in greater detail below, in various embodiments reclustering operations may be performed in response to receipt of a activation indication from a deactivated node whereby, for instance, it is determined that the activating node should no longer be associated with the cluster it was associated with before deactivation.

Accordingly, in various embodiments a node receiving a activation indication from a activating node might act to determine if the activating node was still and/or still should be associated with the cluster that it was associated with before deactivation (step 503). The node receiving the activation indication might, for instance, consult its NI and/or another store in performing the determination.

In the case where it was found that the activating node still was and/or still should be associated with the cluster that it was associated with before deactivation, the node contacted by the activating node could, in various embodiments, request various information from the activating node (step 505). Among the requested information could be, for instance data regarding the activating node and/or information regarding downloadable entities that the activating node's user was making available. In various embodiments, implementation might be such that the activating node responds to such a request by including only that of the requested information that changed since the before it deactivated.

Upon receipt from the requested information, the node contacted by the activating node could act to appropriately update its NI and/or EI, the update perhaps being performed in a manner analogous to that discussed above with respect to registration (step 507).

As a further step in allowing for the activation, the node contacted by the activating node could act to provide a copy of its updated NI and/or EI to the activating node (step 509). In various embodiments, only the changes that had taken place to the NI and/or EI since the activating node deactivated would be supplied to the activating node. Upon receipt of the NI and/or EI data, the activating node could appropriately replace and/or update its NI and/or EI.

It is noted that the data dispatches of the foregoing comunications between the activating node and the node contacted by the activating node could be performed in a number of ways. For example, dispatch could be performed in a manner analogous to that discussed above with reference to a registering node contacting an already-registered node to request registration.

As a further step in allowing for activation, the node contacted by the activating node could provide for receipt by each of the other nodes in its cluster the updated EI (step 511). In certain embodiments, the node contacted by the activating node might provide the entire updated EI for receipt, while in other embodiments only the changes to the EI might be made available.

The EI and/or updates thereto could be made available to the other nodes in the cluster, for instance, via an intra-cluster distribution technique of the sort discussed later herein. Further, in various embodiments the node contacted by the activating node could provide for receipt by each node in each cluster in the network environment the updated NI (step 503). In certain embodiments, the already-registered node could provide the entire updated NI for receipt, while in other embodiments only the changes to the NI might be made available.

The entire updated NI and/or the changes thereto could be made available in a number of ways. For instance, the node contacted by the activating node could make the corresponding data available to a single active node in each other cluster in the network environment via an inter-cluster distribution technique of the sort discussed later herein. The recipient node in each cluster could, in turn, make the corresponding data available to the other nodes in its cluster, for example, via an intra-cluster distribution technique of the sort discussed later herein.

As noted above, in various embodiments the node contacted by the activating node might act to determine if the activating node was still and/or still should be associated with the cluster with which it was associated before deactivation.

In the case where it was found that the activating node was no longer and/or should no longer be associated with the cluster that it was associated with before deactivation, the node contacted by the activating node could, in various embodiments, act to forward the activation indication to a node in the cluster with which the activating node was then and/or should then be associated (step 515). In performing the forwarding, the NI held by the node that received the activation indication from the activating node might be consulted. It is noted that the forwarding could be performed in a number of ways. For example, dispatch of corresponding information could be performed in a manner analogous to that discussed above with reference to a registering node contacting an already-registered node to request registration.

Upon receipt of the forwarded activation indication by the node in the cluster with which the activating node was then and/or should then be associated, various operations could be performed by the activating node and the node that received the forwarded activation indication to allow the activating node to, via the cluster with which it was then and/or should then be associated, resume participation with the clusters of the network environment. Such operations could, for example, be performed in a manner analogous to that discussed above.

As noted above, a activating node attempting to establish initial contact with a node associated with the cluster with which it was associated before deactivation might try to contact a number of such nodes one by one, each other such node until successful contact was made. In the case where such procedure failed to establish successful contact the activating node might, perhaps after retrying one or more of such nodes one or more times, attempt in various embodiments to contact a node associated with a different cluster. The node in the different cluster could be chosen by the activating node, for instance, via a consultation of its held NI. In various embodiments, in the case where the chosen node could not be contacted, one or more other such nodes could be tried, one by one, until successful contact was established.

The activating node could, for instance, request from the chosen node a copy of that node's held NI and/or portions thereof. Upon receiving the requested data, the activating node could, in various embodiments, examine the data to determine if it was still associated with the cluster that it was associated with before it deactivated.

In the case where the activating node found that it was and/or should be associated with a different cluster, it could dispatch a activation indication to a node associated with that cluster. The activating node could choose the target node, for instance, by consulting the received NI data.

Activation operations between the activating node and the contacted node could then proceed in a manner analogous to that discussed above.

In the case where the activating node found that it was not and/or should not be associated with a different cluster, or where no such determination had been performed, the node could consult the received data to see if there were any nodes, in an active deactivated state, associated with the cluster with which it was associated before deactivation.

In the case where such one or more such nodes were found, the activating could attempt to contact one of the nodes in order to initiate activation. In various embodiments, in selecting a node to contact, the activating node could give preference to nodes that it had not yet previously contacted. In various embodiments, the activating node might act to, one by one, attempt to contact one or more of the nodes until successful contact was made.

Upon establishing communication with one of the nodes, the activating node and the contacted node could perform various operations to allow the activating node to resume participation with the clusters of the network environment. Such operations could, for example, be performed in a manner analogous to that discussed above.

In the case where the activating node found each node associated with the cluster with which it was associated before deactivation to be in a deactivated state, and/or where the node found there to be no nodes other than itself associated with the cluster, the node could act to activate itself with respect to the cluster.

In the case where the node found no node other than itself to be associated with the cluster, the node could, for instance, in acting to activate itself act to update its NI and/or EI to indicate that it was now activated to indicate, any entities that it was making available, and/or to indicate that no other nodes were associated with its cluster.

In the case where the node found that there were nodes other than itself associated with the cluster, but that each of these nodes was deactivated, the node could, for instance, in acting to activate itself act to update its NI and/or EI to indicate that it was now activated, to indicate any entities that it was making available, and/or to indicate that the other nodes associated with its cluster were deactivated.

In doing the update, the node might, in various embodiments, employ NI information that it had received. Moreover, the node might, for example, act to distribute information regarding its updated NI to a single active node in each other cluster in the peer-to-peer environment, perhaps employing an inter-cluster distribution technique of the sort described in greater detail below. The recipient node in each cluster could, in turn, distribute the information to the other nodes in its cluster. Distribution could, for example be by way of an intra-cluster distribution technique of the sort described in greater detail below.

Entity Index Update

According to various embodiments of the present invention, in the case where there is a change in the downloadable entities being made available by a node associated with a cluster in a network environment (e.g., a peer-to-peer environment), the node may act to accordingly update its EI. In updating its EI the node might, for example, appropriately add and/or modify entries or the like in light of additional entities being made available and/or entities that were previously available being made unavailable.

After updating its EI the node could, in various embodiments, provide for receipt by each of the other nodes in its cluster the updated EI. In certain embodiments, the node might provide the entire updated EI for receipt, while in other embodiments only the changes to the EI might be made available. The EI and/or updates thereto could be made available to the other active nodes in the cluster, for instance, via an intra-cluster distribution technique of the sort discussed later herein.

Held in the EI could, in various embodiments, be information corresponding to available downloadable entities including, for example, entity names, entity sizes (e.g., in megabytes), an indication as to whether one or more particular nodes making available the entity were active or not, identification numbers corresponding to one or more particular nodes making available the entity, network addresses or the like corresponding one or more particular nodes making available the entity, and/or the like.

It is noted that, in various embodiments, appropriate EI entries might be deleted in the case where an entity that had previously been available is made unavailable, while in other embodiments such entries might not be deleted but instead be modified to indicate the change in availability. Moreover, it is noted that, in various embodiments, in the case where a node making available an entity deactivates and activates a number of times, each event could, for example, be separately listed in the EI. As another example, only an entry corresponding to the current state of that node might be maintained in the EI.

Query

According to various embodiments of the present invention, a user of a node in a network environment (e.g., a peer-to-peer environment) can employ his node to search in the network environment for downloadable entities.

Figure 6:
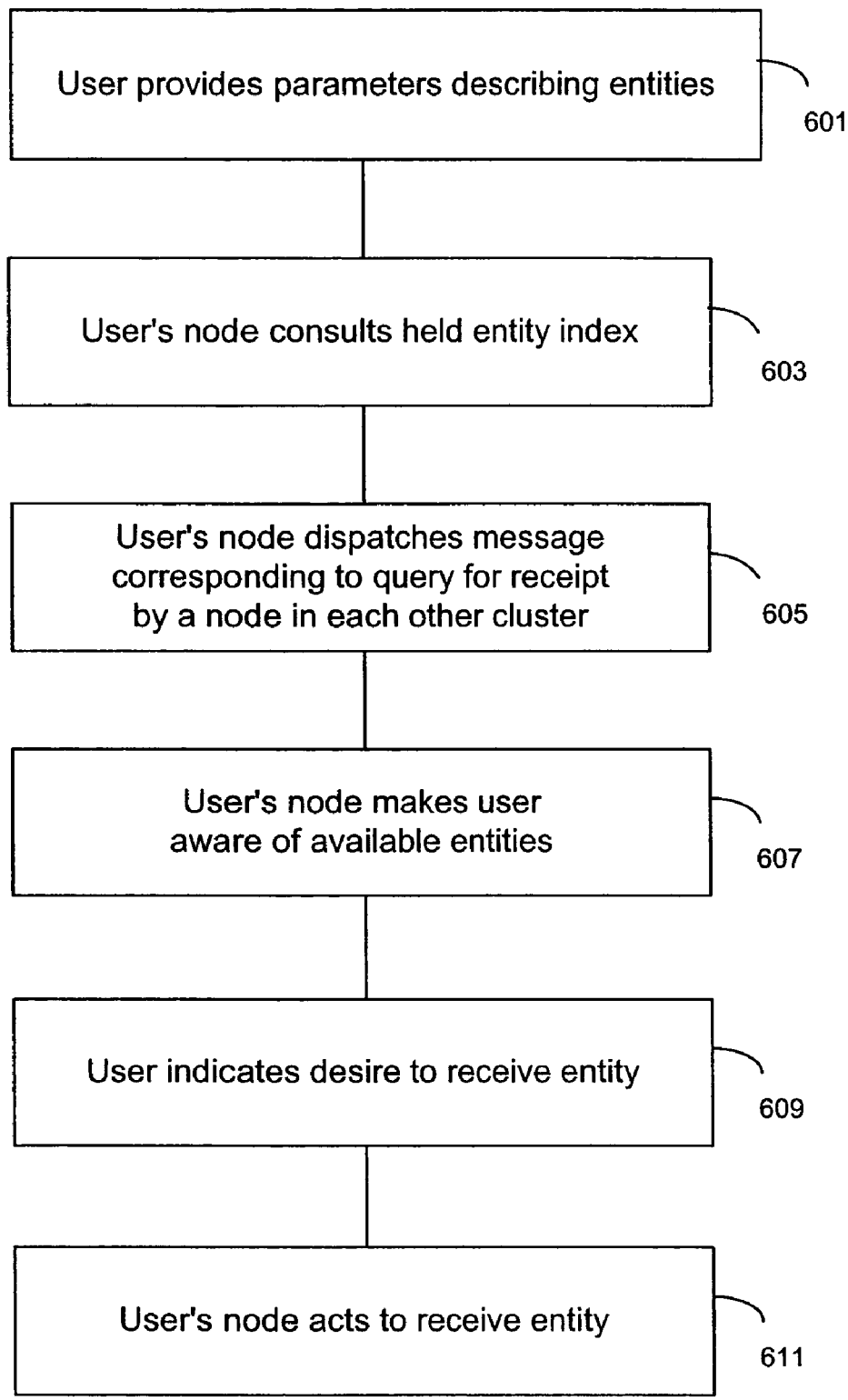
FIG. 6 is a diagram depicting exemplary steps involved in query according to various embodiments of the present invention.

For instance, as depicted in FIG. 6 the user could employ a GUI or the like provided by his node in order to provide various parameters describing entities for which he wished to receive indication of availability (step 601).

As is discussed above, in various embodiments a node in a particular cluster is aware of the downloadable entities being made available by the nodes in the cluster via its held EI. Accordingly, in the case where a user requests that his node search for a particular downloadable entity, the node could, for instance, first consult its held EI (step 603).

Having consulted its EI the node could, in various embodiments, dispatch a message, corresponding to the query, for receipt by a node in each other cluster in the network environment (step 605). Such dispatch could, for example, be implemented by way of an inter-cluster distribution technique described in greater detail below. It is noted that, in various embodiments, in the case where the user's node found, by way of its EI consultation, one or more downloadable entities matching the search query, the node might not act to dispatch a message corresponding to the query for receipt by a node in each cluster in the network.

Responsive to a receipt of such a query message, a node in a cluster could, for instance, consult its held EI. In the case where the consultation yielded downloadable entities matching the search query, the node could dispatch, for receipt by the node the initiated the query, a message providing information regarding the entities.

It is noted that, in various embodiments, in the case where the consultation yielded no downloadable entities matching the search query, a message indicating that result might be dispatched to the node the initiated the query. Such messages reporting results could be dispatched in a number of ways. For example, the data could be dispatched in a manner analogous to that discussed above with respect to a node contacting another node for purposes of registration.

Having, for example, consulted its held EI, and perhaps having received one or more query responses from nodes in one or more other clusters, the node that dispatched the query could make its user aware of available entities (step 607). Such functionality could be implemented, for instance, by use of a GUI or the like.

In the case where the user wished to receive one of the available entities, the user could, in various embodiments, be able to indicate a desire to do so via, for example, a GUI or the like provided by his node (step 609). In response, his node could act to receive the entity (step 611). Such functionality could be implemented in a number of ways. For example, the user's node could act, for each entity requested by its user, to dispatch to a node holding the entity a request to receive the entity. Upon receipt of the request, the node holding the entity could dispatch it to the user's node.

Dispatch of the request and the entity could be performed in a number of ways. For example, the data could be dispatched in a manner analogous to that discussed above with respect to a node contacting another node for purposes of registration. It is noted that, in various embodiments, in the case where more than one node holds a requested entity, the user's node could act to choose one of the nodes from which to request the entity. Such functionality could be implemented in a number of ways.

For example, the user's node might act to preferentially request the entity from a node in its own cluster rather than from a node in a another cluster. As another example, the user's node might keep track of the nodes from which it requests entities, and act to preferentially choose to request an entity from a node from which it has requested entities less frequently and/or less recently over a node from which it has requested entities more frequently and/or more recently.

Reclustering

Figure 7:
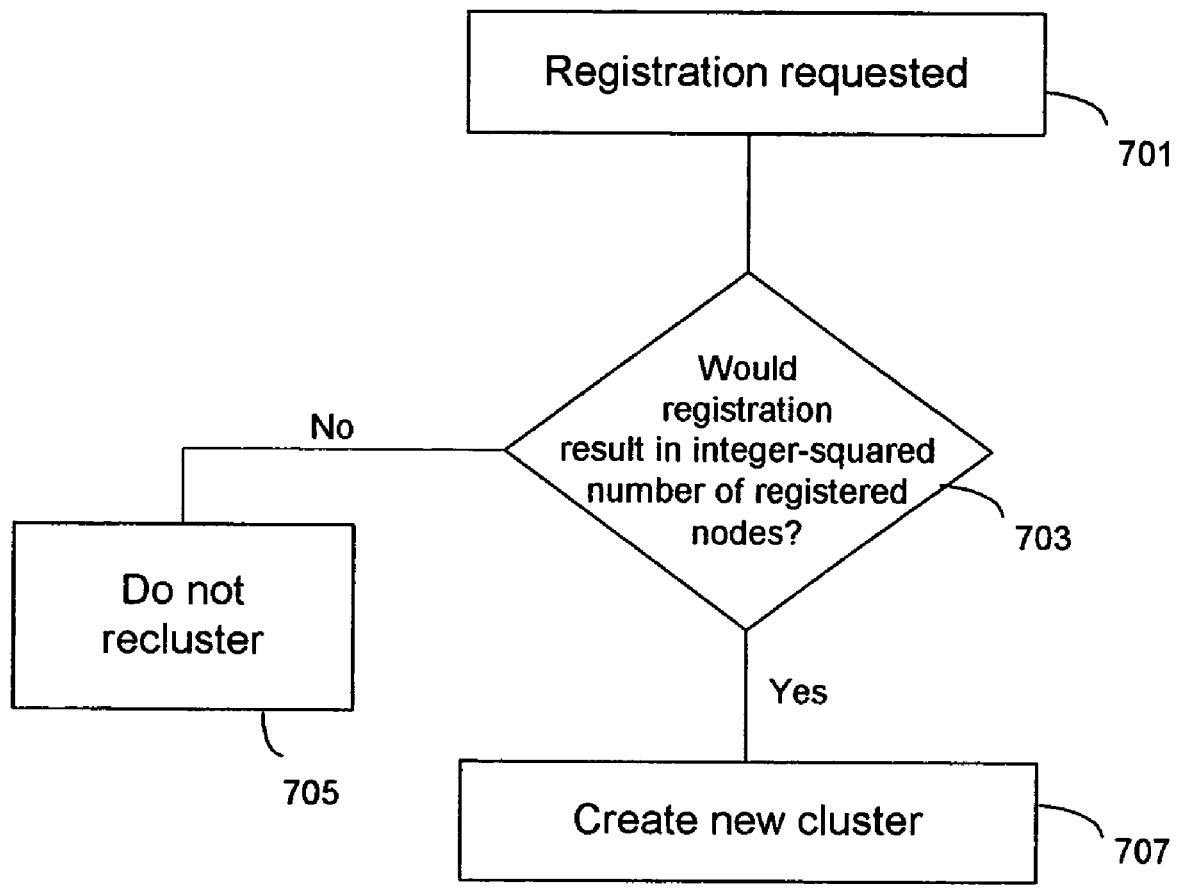
FIGS. 7-11 are diagrams depicting exemplary steps involved in reclustering according to various embodiments of the present invention.

As alluded to above, in various embodiments, included in the NI held by each node in a network environment (e.g., a peer-to-peer network) could be an indication corresponding to each node registered in the network environment. Accordingly, for example, with respect to FIG. 7 it is noted that in the case where a node acts in response to receipt of a registration request (step 701), the receiving node could, in various embodiments, consult its NI in order to determine if registration of the registering node would result in meeting established criteria for the performance of one or more reclustering operations. Such established criteria might be set, for example, by a system administrator or the like.

Figure 8:
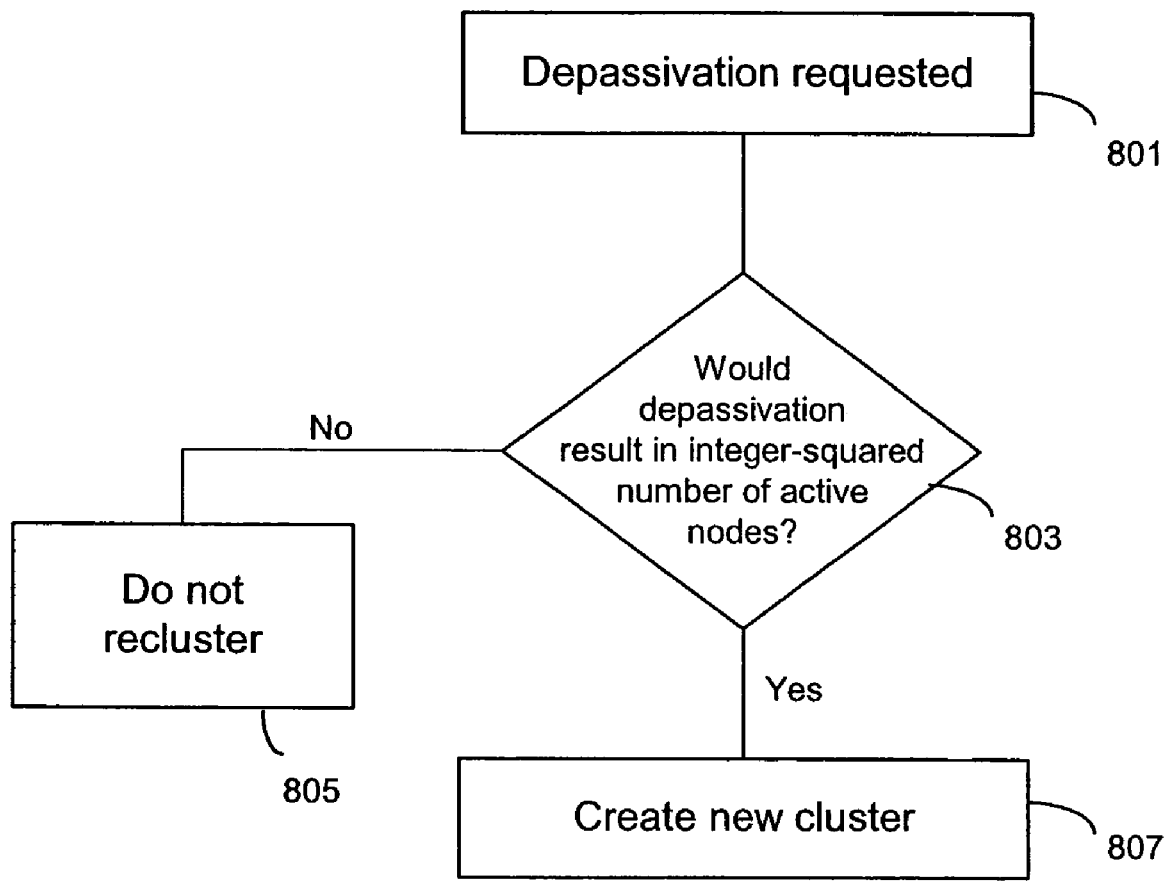

As another example, it is noted with respect to FIG. 8 that in the case where a node acts in response to receipt of a activation indication (step 801), the node receiving node could, in various embodiments, consult its NI in order to determine if activation of the activating node would result in meeting established criteria for the performance of one or more reclustering operations.

Established criteria could, for example, specify that one or more new clusters should be created in the case where the registration of a node requesting registration would result in an integer squared number of registered nodes in the network environment (step 703). In various embodiments, a number of new clusters could be created so that the number of clusters would be equal to the square root of the number of registered nodes in the network environment.

Accordingly, such established criteria could be met, for example, where the registration of a node requesting registration would result in there being 4, 9, 16, or 25 registered nodes in the network environment, as each of 4, 9, 16, and 25 is equal to an integer squared (i.e., has an integer for its square root).

As another example, established criteria could, for instance, specify that one or more new clusters should be created in the case where the activation of a activating node would result in an integer squared number of active (i.e., not deactivated) nodes in the network environment (step 803). In various embodiments, a number of new clusters could be created so that the number of clusters would be equal to the square root of the number of active nodes in the network environment.

As yet another example, established criteria could, for instance, specify that a new cluster should be created in the case where the activation of a activating node would result in an integer squared number of active (i.e., not deactivated) nodes in the network environment a specified percentage of the time. Such a percentage might bet set, for instance, by a network administrator or the like. As a specific example, the percentage might be set to 75.

Determination of whether the criteria was met with regard to the specified time percentage could, for instance, involve consultation of a store indicating deactivation and/or activation events executed by various nodes in the network environment. Such a store could, in various embodiments, be an EI and/or NI. Accordingly, such established criteria could be met, for instance, when the activation of a activating node would result in there being, perhaps for a specified percentage of time, 4, 9, 16, or 25 active nodes in the network environment.

Figure 9:
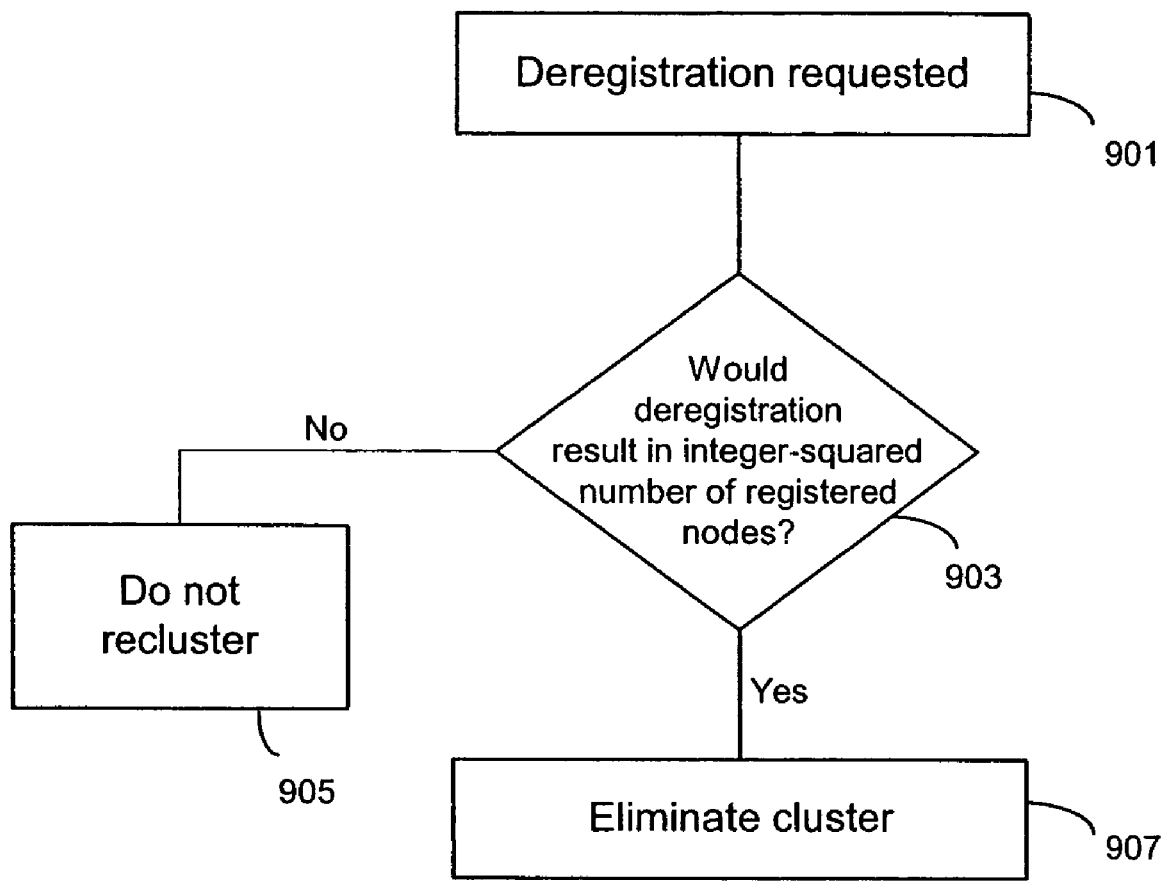

With respect to FIG. 9 it is noted that, in various embodiments, established criteria could, for example, specify that one or more clusters should be eliminated in the case where the deregistration of a node requesting deregistration would result in an integer squared number of registered nodes in the network environment (steps 901, 903). In various embodiments, a number of clusters could be eliminated so that the number of clusters would be equal to the square root of the number of registered nodes in the network environment. Accordingly, such established criteria could be met, for instance, when the deregistration of a node requesting deregistration would result in there being 4, 9, 16, or 25 registered nodes in the network environment.

Figure 10:
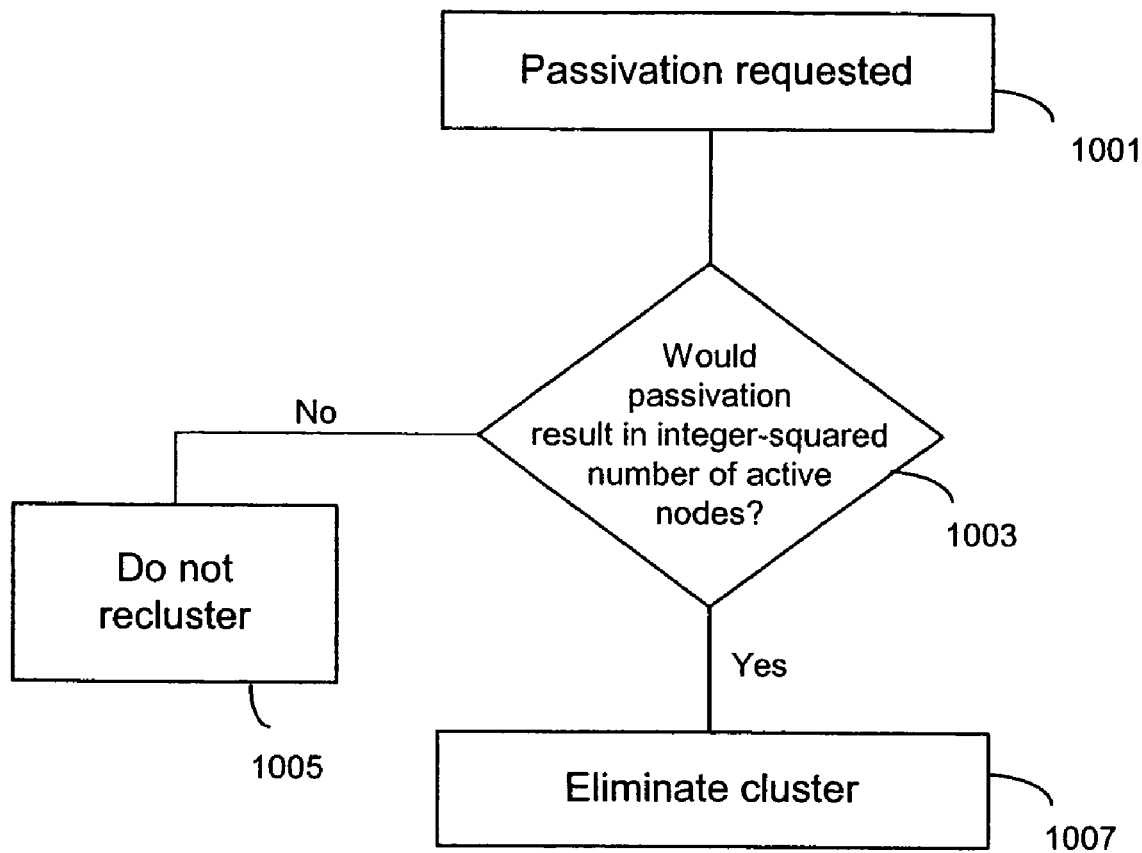

With respect to FIG. 10 it is noted that, as another example, in various embodiments established criteria could, for instance, specify that one or more clusters should be eliminated in the case where the deactivation of a deactivating node would result in an integer squared number of active (i.e., not deactivated) nodes in the network environment (steps 1001, 1003). In various embodiments, a number of clusters could be eliminated so that the number of clusters would be equal to the square root of the number of active nodes in the network environment.

As yet another example, established criteria could, for instance, specify that a cluster should be eliminated in the case where the deactivation of a deactivating node would result in an integer squared number of active (i.e., not deactivated) nodes in the network environment a specified percentage of the time. Such a percentage might bet set, for instance, by a network administrator or the like. As a specific example, the percentage might be set to 75.

Determination of whether the criteria was met could with regard to the specified time percentage could, for instance, be performed in a manner analogous to that discussed above. Accordingly, such established criteria would be met, for instance, when the deactivation of a deactivating node would result in there being, perhaps for a specified percentage of time, 4, 9, 16, or 25 active nodes in the network environment.

In various embodiments, in the case where such criteria are not met, no reclustering might be performed (step 705, step 805, step 905, step 1005). Where a new cluster is to be created or eliminated, such as in response to a registration request and/or activation indication, a number of operations may be performed.

For example, where a new cluster is to be created (step 707, 807), there might be a determination of the nodes that should be associated with the new cluster. Such a determination might be made, for instance, by the node that received the registration request and/or activation indication, and might, for instance, be made in accordance with one or more specified criteria, the criteria perhaps having been set by a system administrator or the like.

Such criteria might, for example, specify that the new cluster include the node that received the registration request and/or activation indication, the node that dispatched the registration request and/or activation indication, and/or one or more nodes from one or more of the other clusters in the network environment.

As a specific example, such criteria might specify that the new cluster include the node that received the registration request and/or activation indication, the node that dispatched the registration request and/or activation indication, and a single node from each cluster in the network environment.

As another example, where a cluster is to be eliminated (step 907, 1007), there might be a determination of the cluster that should be eliminated and/or of one or more clusters that should receive the nodes of the cluster being eliminated. Such a determination might be made, for instance, by the node that received the registration request and/or activation indication, and might, for instance, be made in accordance with one or more specified criteria, the criteria perhaps having been set by a system administrator or the like.

Such criteria might, for example, specify that the cluster with the least members be eliminated and/or that the nodes of the cluster being eliminated be placed in one or more of the smallest clusters of those clusters not being eliminated.

It is noted that, in various embodiments, ideal cluster size might be considered to be equal to the number of clusters. In various embodiments, in the case where transfer of nodes among clusters was required to achieve this, such operations could be performed, for instance, in a manner analogous to that discussed later herein.

In various embodiments, nodes in a network environment could act to make various traffic measurements. Such a node might, for example, constantly make such measurements. As another example, such a node might make such measurements in response to received request to do so. Such a request might, in various embodiments, include specification of the time period or periods for which measurements should be done. Various traffic measurements could be made. For example, measurements of traffic corresponding to NI updates, EI updates, queries for downloadable entities, dispatch of downloadable entities, inter-cluster traffic, intra-cluster traffic, and/or the like might be made.

Figure 11:
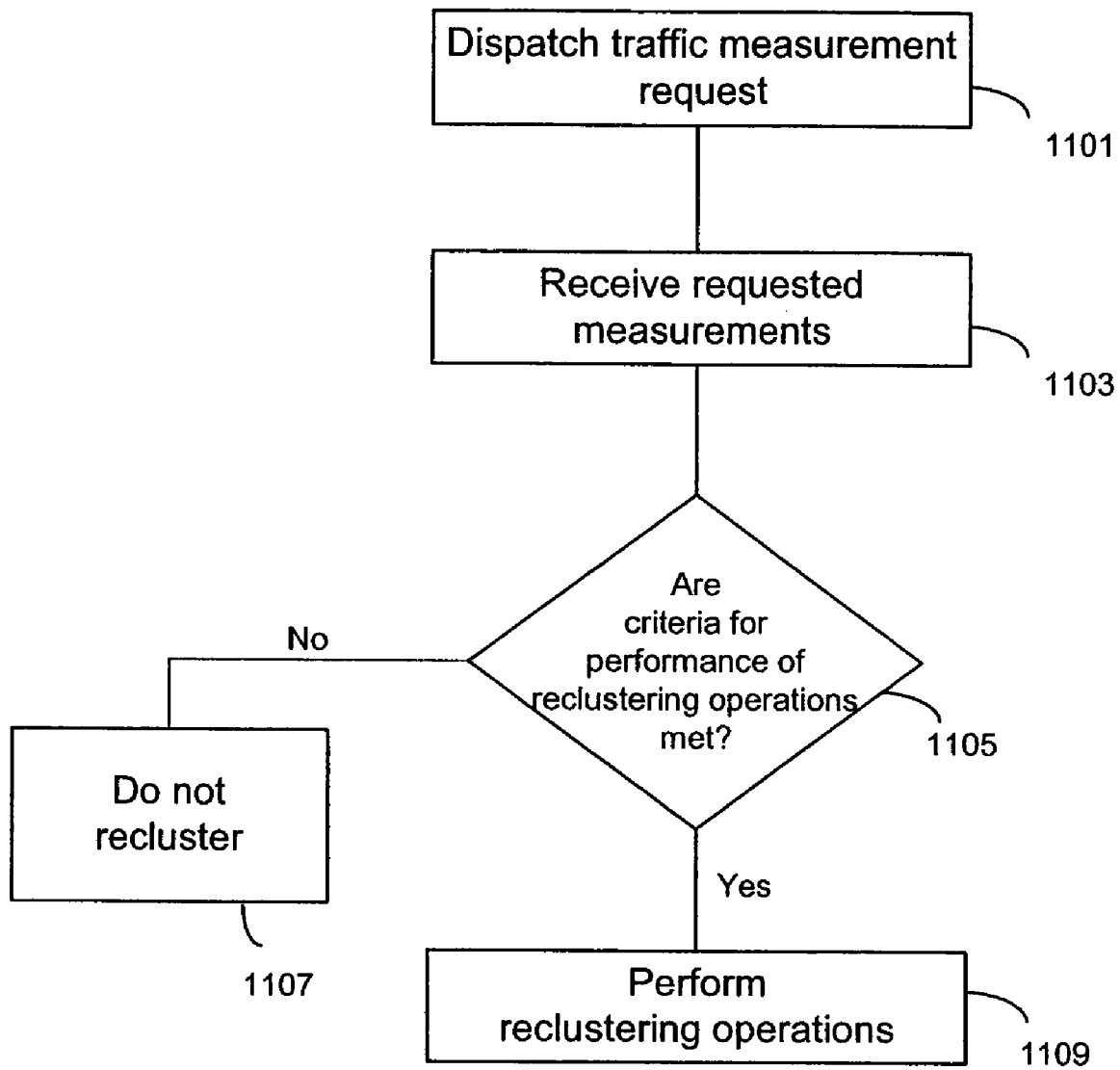

With respect to FIG. 11 it is noted that, in various embodiments, a node, perhaps in response to the satisfaction of one or more criteria, might act to dispatch a traffic measurement request for receipt by each active node in the network environment (step 1101). Such criteria might, for example, include expiration of a timer. As another example, in various embodiments a node may possess a bit that is set to one value when traffic level is within an established threshold and another value when traffic level is not within the threshold. In the case where the bit indicated that traffic level was not within threshold, the traffic request might be dispatched. Such a threshold might, for instance, be set by a system administrator or the like.

As noted above, the request might, for instance, include a specification of the time period or periods for which measurements should be done. Alternately or additionally the request might, for instance, include an indication that measurements corresponding to one or more specified time periods be returned.

Included in the request could, in various embodiments, be a network address and/or other identifier corresponding to the node that initiated the request. Distribution of the request could be performed, for instance, in a manner analogous to that discussed above with regard to distribution of NI updates. Upon receipt of such a request, a node could act in accordance with the request to perform any requested measurement and/or to return requested measurements to the node that initiated the request.

Such return of requested measurements could be performed in a number of ways. For example, return could be performed by each recipient node in a manner analogous to that discussed above with respect to communications between a node requesting registration and the node receiving the request. As another example, nodes in a cluster could act to forward their measurements to the node in their cluster that first received the request, and rely upon that node to return the measurements to the node that initiated the request. In various embodiments, one or more traffic measurements for a cluster might be aggregated. Moreover, a node in a cluster, perhaps via an intra-cluster distribution technique of the sort described herein, may come to know of measurements taken by other nodes in its cluster and/or of aggregate measurements for its cluster.

Upon receipt of requested measurements (step 1103), the node that initiated the request could act to determine if established criteria for the performance of one or more reclustering operations had been met (step 1105). Such criteria might be specified, for instance, by a system administrator or the like. In various embodiments, in the case where such criteria were not met, no reclustering might be performed (step 1107). Where, in various embodiments, such criteria were met, appropriate recluster operations could be performed (step 1109).

Such criteria might specify, for example, that one or more new clusters be created if one or more traffic level indications had risen above one or more specified values. As another example, such criteria might specify that one or more clusters be eliminated if one or more traffic level indications had dropped below one or more specified values. As yet another example, such criteria might specify that one or more nodes be moved from one or more existing clusters to one or more other existing clusters.

The criteria might, in various embodiments, additionally specify and/or allow for determination of which one or more clusters should be eliminated, which one or more clusters should lose and/or gain nodes, which one or more nodes should be moved away from their present one or more clusters, and/or the like. It is noted that, in various embodiments, nodes may be shifted among clusters, new clusters may be created, and/or existing clusters may be eliminated so as to create clusters in the network environment having similar traffic levels to one another.

The level of entity index update traffic produced by a node could, for example, be taken into account in determining if that node should stay in its cluster. Moreover, in various embodiments, determination of which one or more clusters should loose and/or gain nodes, which one or more nodes should be moved away from their present one or more clusters, and/or the like might take into account computation of ideal cluster size for the one or more clusters.

For instance, in various embodiments it might be established that ideal size for a cluster be equal to the square root of the number of registered or active nodes in the network environment times the ratio of inter-cluster traffic to intra-cluster traffic in the cluster or in the network environment:

$$\text{size} = \sqrt{n \cdot \frac{\text{INTER-CLUSTER}}{\text{INTRA-CLUSTER}}}$$

where n is equal to the number of registered or active nodes.

In various embodiments, in determining movement of nodes among clusters, one or more trade requests could be dispatched from a node. For instance, such a node could pass such a request to a node in each other cluster, perhaps via an inter-cluster distribution technique of the sort described herein. Included in the request could be, for instance, an indication of measured inter-cluster traffic, measured intra-cluster dispatch traffic, and cluster size for the cluster of the node sending the request. In some embodiments cluster size could reflect the number of active nodes, while in other embodiments it could reflect the number of registered nodes. A recipient of the request could, for example, consult an understanding of its ideal cluster size to determine if it could offer a node from its cluster and/or accept a node to its cluster.

Response to the trade request could, for example, be dispatched in a manner analogous to that discussed above with respect to a node contacting a another node for purposes of registration. Moreover, it is noted that, in various embodiments, a node may possess a bit that is set to one value when traffic level is within an established threshold, and another value when traffic level is not within the threshold. Nodes indicating within-threshold traffic levels could, in various embodiments, be seen as indicative of themselves or their clusters being able to accept additional traffic. Accordingly, for example, nodes might be shifted to such a cluster. Such a threshold might, in various embodiments, be set by a system administrator or the like.

Accordingly, where one or more clusters are to be added, one or more clusters are to be eliminated, and/or there is to be transfer of one or more nodes between one or more clusters, one or more operations may take place in order for the required changes to be made in the network environment.

For example, in various embodiments the node that initiated the measurement request, received the registration request, and/or received the activation indication might act in accordance with applicable criteria to, for instance, update its NI to reflect the transfer of one or more nodes to one or more new clusters, to reflect the transfer of one or more nodes associated with one or more clusters being eliminated to one or more clusters receiving those nodes, and/or to reflect the transfer of one or more nodes between one or more existing clusters.

As a further step, the node might act to make the other nodes in the network environment aware of the change to the NI. Such an operation could, for example, be performed in a manner analogous to that discussed above. A node becoming aware of the change to the NI could act to replace or update its held NI. Such an operation could, for example, be performed in a manner analogous to that discussed above.

In various embodiments, upon becoming aware of an NI change, a node could act to determine if the change resulted in it being associated with a different cluster than it had been associated with before. In the case where a node so discovered that it was associated with a different cluster, it might perform one or more operations.

For example, the node might act to inform the nodes in the cluster with which it had been associated of the change so that each could appropriately update its held EI. Such functionality might, for instance, be implemented in a manner analogous to that discussed above with respect to deregistration of a node.

Moreover, the node might, in various embodiments, act to inform the nodes in the cluster with which it was newly associated of the entities it was making available so that each node in the cluster could appropriately update its held EI. Such functionality might, for instance, be implemented in a manner analogous to that discussed above with respect to EI update.

Distribution Techniques

As noted above, according to various embodiments of the present invention, various intra-cluster and inter-cluster distribution techniques are employed. Various such techniques will now be discussed in greater detail.

According to various embodiments, intra-cluster distribution may, for example, be performed in a manner where data is passed from node to node in a cluster such that each node receives the data from one node and passes it to another node, perhaps with no node in the cluster receiving the data more than once.

Figure 12:
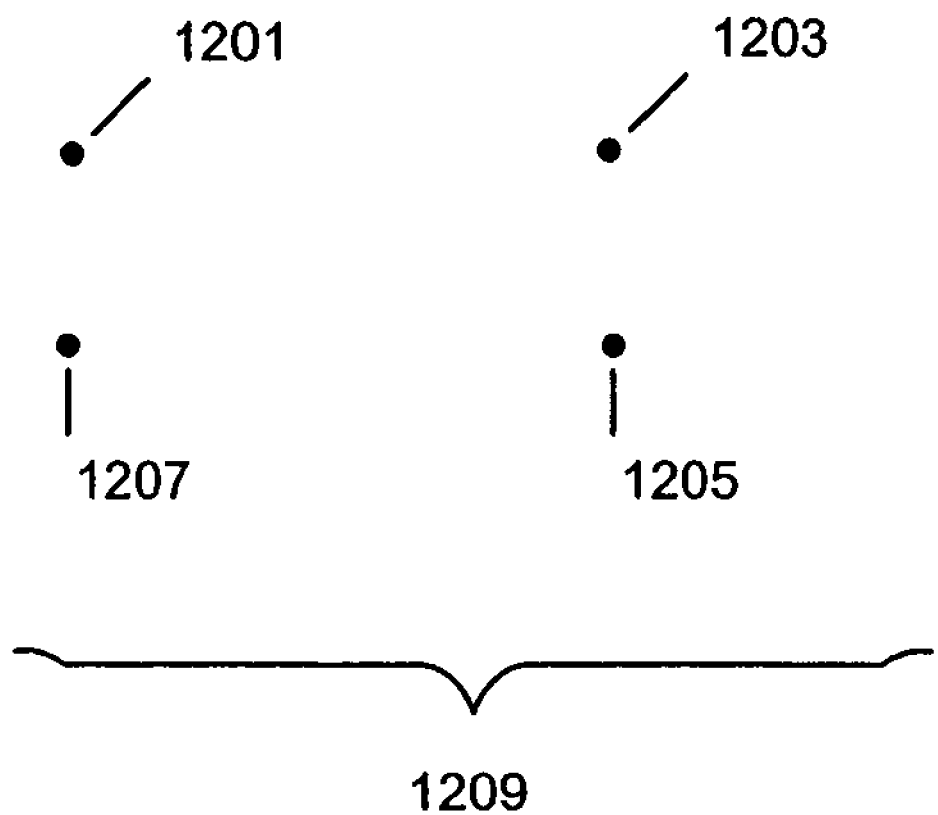
FIGS. 12-16 are diagrams depicting exemplary steps involved in intra-cluster distribution according to various embodiments of the present invention.

Shown in FIG. 12 is an exemplary depiction of such an intra-cluster distribution technique where data is passed from node 1201 to node 1203, from node 1203 to node 1205, and from node 1205 to 1207, with all nodes being in cluster 1209.

Such intra-cluster distribution functionality may be implemented in a number of ways. For instance, in various embodiments assigned to each node in the network environment associated with a cluster could be a node identification number with respect to the cluster. Such a number might be assigned to a node, for instance, upon its association with a cluster (e.g., via a registration or being moved to a cluster from another cluster). Node identification numbers might, for example, be stored in the NI held by each node in a network environment. In various embodiments, node identification number assignment could involve consulting the NI to determine numbers already assigned to nodes with respect to the cluster, and assigning a number other than one already assigned.

Accordingly, among the data held in the NI for a particular node in the network environment in such embodiments could be, for instance, that node's identification number or the like, a cluster identification number or other indication of the cluster with which the node is associated, the node's network address and/or the like, an indication of whether or not the node is deactivated, and/or the like.

In such embodiments, a node seeking to dispatch data in its cluster via intra-cluster distribution could choose a first active (i.e., not deactivated) node in his cluster to receive the data. In choosing the active node, the node seeking to dispatch data could employ its held NI. The node seeking to dispatch data could, for instance, choose from the NI the active node in its cluster having, among nodes associated with that cluster, the identification number most proximal to its own identification number.

In certain embodiments the node seeking to dispatch data might choose the node associated with the identification number most proximal and greater in numerical value than its own, while in other embodiments it might choose the node associated with the identification number most proximal and lower in numerical value than its own.

It the case where the node seeking to dispatch data determines that there is no active node having an identification number appropriately proximal, the node might consider the active node having the appropriately most extreme value to have the appropriately proximal value. To illustrate by way of example, where the identification numbers with respect to active nodes a particular cluster were 1, 3, and 5, and identification numbers with greater numerical values were to be chosen, where the node having identification number 5 wished to perform such intra-cluster distribution, it could act to choose as a data receipt the node associated with identification number 1, as there was no active node having an identification number greater than 5 and 1 was the appropriately most extreme value (i.e., the lowest value in the set of identification numbers).

In various embodiments, included in the dispatched data could be an indication as to whether the node seeking to dispatch data choose as recipient a node having an identification number of greater numerical value or lower numerical value. Alternately, a system administrator or the like might chose one of greater numerical value or lower numerical value for use by nodes in the network environment for such intra-cluster distribution.

The node seeking to dispatch data could, in various embodiments, include along with the data an indication that the receive data should be distributed via intra-cluster distribution, its network address and/or the like, its identification number and/or the like, an indication as to whether identification numbers of greater or lower numerical value should be chosen, and/or the like.

The node seeking to dispatch data could dispatch the data in a number of ways. For instance, the data could be dispatched in a manner analogous to that discussed above with respect to a node contacting another node for purposes of registration. Upon receipt of the data, the chosen node could, in various embodiments, consult its NI to determine the active node in the cluster that should next receive the data. Such functionality could, for example, be implemented in a manner analogous to that discussed above with respect to the node seeking to dispatch data choosing a recipient node.

In the case where the chosen node determined that the next recipient would be the node that initiated the distribution, it could, in various embodiments, terminate the distribution with the understanding that all nodes in the cluster had received the data. In the case where the chosen node found that the next recipient would not be the node that initiated the distribution, the chosen node could seek to dispatch the data to the recipient node. Dispatch could be performed, for instance, in a manner analogous to that discussed above with respect to the node that initiated the distribution dispatching data to the node that it chose. Having received the data, the node found to be the next recipient could act in a manner analogous to that of the node that found it to be the next recipient.

As another example of intra-cluster distribution, in various embodiments, each node in the network environment may know of an active upstream neighbor node and/or an active downstream neighbor node in the cluster with which it is associated, and the distribution may be implemented in a manner that employs that knowledge.

Figure 13:
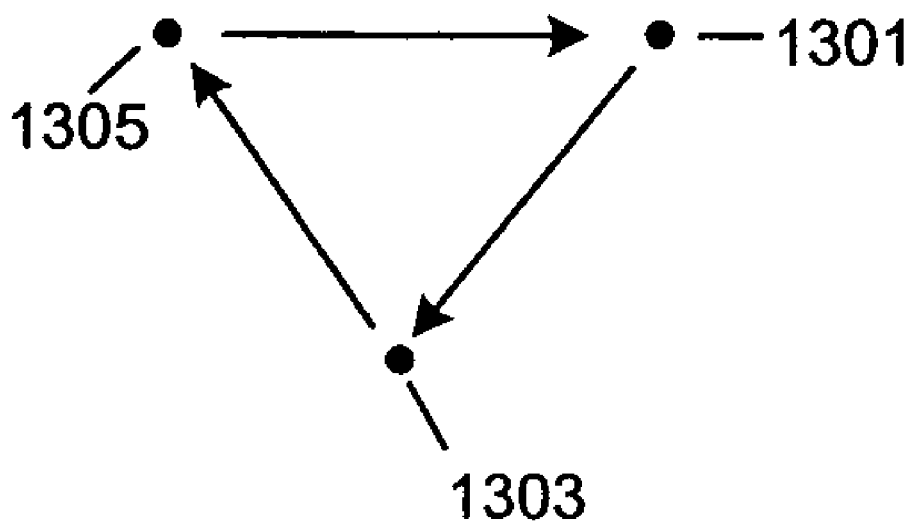

For example, with respect to FIG. 13, in various embodiments active node 1301 could have active node 1303 as its downstream neighbor and active node 1305 as its upstream neighbor, active node 1303 could have active node 1305 as its downstream neighbor and active node 1301 as its upstream neighbor, and active node 1305 could have active node 1301 as its, downstream neighbor and active node 1303 as its upstream neighbor. It is noted that, in various embodiments, in the case where there a particular cluster had associated with it only single active node, that node could consider itself to be both its upstream and downstream neighbor.

As discussed above, in various embodiments a node becoming associated or reassociated with a cluster via registration, activation, reclustering, or the like could act to contact a node of that cluster. In various embodiments, the node becoming associated or reassociated might come to know of its neighbors in the cluster by way of data dispatched by the contacted node. Among the dispatched information could be, for example, the network address and/or the like associated with each neighbor. Various techniques could be employed in determining the upstream and downstream neighbors that should be associated with a particular node.

For example, turning again to FIG. 13, in the case where the node becoming associated or reassociated the contacted node 1301, node 1301 could dispatch data indicating itself to be the upstream neighbor and node 1303 to be the downstream neighbor of the node becoming associated or reassociated. Further, node 1301 could inform node 1303 that the node becoming associated or reassociated was its new upstream neighbor, and node 1301 could consider the node becoming associated or reassociated to be its downstream neighbor.

Figure 14:
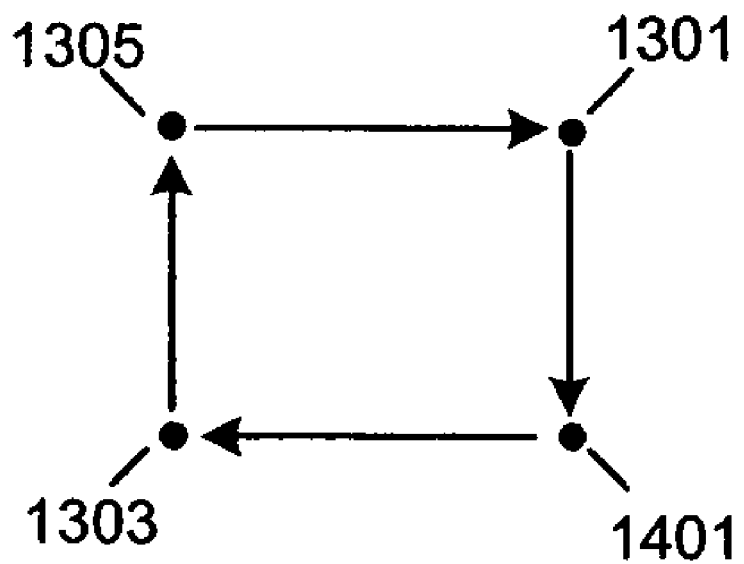

The result of the operations could be as depicted in FIG. 14, wherein the node becoming associated or reassociated is labeled as node 1401. As shown in FIG. 14, active node 1301 has active node 1401 as its downstream neighbor and active node 1305 as its upstream neighbor, active node 1401 has active node 1303 as its downstream neighbor and active node 1301 as its upstream neighbor, active node 1303 has active node 1305 as its downstream neighbor and active node 1401 as its upstream neighbor, and active node 1305 has active node 1301 as its downstream neighbor and active node 1303.

In the case where a node ceases to be associated with and/or ceases to be an active node with respect to a cluster (e.g., via deregistration, deactivation, and/or reclustering), various operations could be performed to ensure that each remaining active node in the cluster was aware of an active upstream neighbor and an active downstream neighbor. For example, in various embodiments, a node so ceasing to be associated with and/or ceasing to be an active node with respect to a cluster could act to dispatch messages to its upstream neighbor and/or downstream neighbor.

Included in such a message dispatched to the downstream neighbor could be an indication that the downstream neighbor should consider its upstream neighbor to be the node that had been the upstream neighbor of the node ceasing to be associated with and/or ceasing to be an active node with respect to the cluster. Included in such a message dispatched to the upstream neighbor could be an indication that the upstream neighbor should consider its downstream neighbor to be the node that had been the downstream neighbor of the node ceasing to be associated with and/or ceasing to be an active node with respect to the cluster. Included in the messages could, for instance, be network addresses and/or the like corresponding to the indicated nodes. Having received the messages, the nodes could update their knowledge of their neighboring nodes.

Such behavior will now be illustrated by way of example. Turning again to FIG. 14, in the case where, for instance, node 1401 ceased to be associated with and/or ceased to be an active node with respect to its cluster, via the dispatch of appropriate messages of the sort discussed above from node 1401 to nodes 1301 and 1303, node 1301 could come to consider its downstream neighbor to be node 1303, and node 1303 could consider its upstream neighbor to be node 1301.

In embodiments of the present invention where nodes in a cluster are aware of neighboring nodes as described above, a node seeking to dispatch data in its cluster via intra-cluster distribution could act to dispatch the data to its downstream neighbor. The node could, for instance, direct the data to a network address it understood to be associated with the neighbor. In various embodiments, included with the dispatched data could be an identifier corresponding to the node seeking to dispatch data. Upon receipt of the data, the neighbor node could act to forward the data to its downstream neighbor.

A node receiving a forwarding of the data could, in various embodiments, act in a manner analogous to that of the node that received the data from the node that initiated the distribution. Accordingly, the data could be passed from neighbor to neighbor in the cluster.

It is noted that, in various embodiments, a node receiving the data might act to not forward the data to its downstream neighbor in the case where it determined that the downstream neighbor was the node that originated dispatch of the message. Such functionality could be implemented, for instance, with the understanding that such an occurrence would indicate that all nodes in the cluster had already received the data.

Dispatch of data between nodes in embodiments of the present invention employing such intra-cluster communications wherein nodes in a cluster are aware of neighboring nodes as described above could, for example, be performed in a manner analogous to that discussed above with respect to a node contacting another node for purposes of registration. It is noted that, in various embodiments, a node might be aware of only its upstream neighbors instead of being aware of both its neighbors.

As yet another example, in various embodiments intra-cluster distribution may be preformed in a manner where data is passed from a node in a cluster directly to each of one or more other nodes in the cluster. In certain embodiments the node might act to only dispatch the data to nodes in the cluster understood to be active (i.e., not deactivated), while in other embodiments the node might act to dispatch the data to all nodes in the cluster, irrespective of active status, with the understanding that data sent to a deactivated node would simply not be received by that node.

Figure 15:
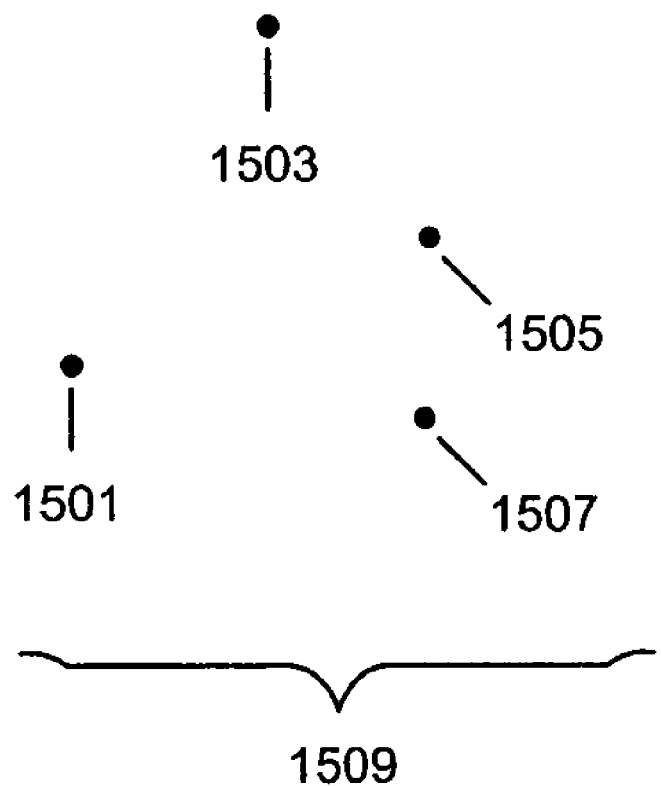

Shown in FIG. 15 is an exemplary depiction of such an intra-cluster distribution technique where data is passed from node 1501 directly to each of nodes 1503, 1505, and 1507, with all nodes being in cluster 1509.

Such intra-cluster distribution functionality could be implemented in a number of ways. For instance, in various embodiments stored in the NI could be, for each node in the network environment, an indication of the cluster with which the node is associated, a network address or the like corresponding to the node, an indication of whether or not the node is deactivated, and/or the like.

Accordingly, a node seeking to dispatch data to all nodes in its cluster via this intra-cluster distribution technique could, for example, consult its NI to learn the network addresses or the like of all nodes associated with the cluster with which it is associated. As another example, the node consult its NI to learn the network addresses or the like of all active nodes associated with the cluster with which it is associated. Having consulted the NI, the node could act to dispatch the data to each node and/or each active node as appropriate.

Such dispatch could be performed in a number of ways. For example, the data could be dispatched in a manner analogous to that discussed above with respect to a node contacting another node for purposes of registration. As still another example of intra-cluster distribution, in various embodiments distribution may be preformed in a manner where each node in a cluster maintains an ordered list of all active (i.e., not deactivated) nodes in the cluster.

Such a node may maintain the list, for example, by consulting its held NI. The node may, in various embodiments, order the list, for example, numerically in accordance with network addresses, identification numbers, and/or the like associated with the nodes. Moreover, the node may, in various embodiments, act to shift the ordered list such that the list entry corresponding to itself is at an extreme end of the list (e.g., the list's first element).

Figure 16:
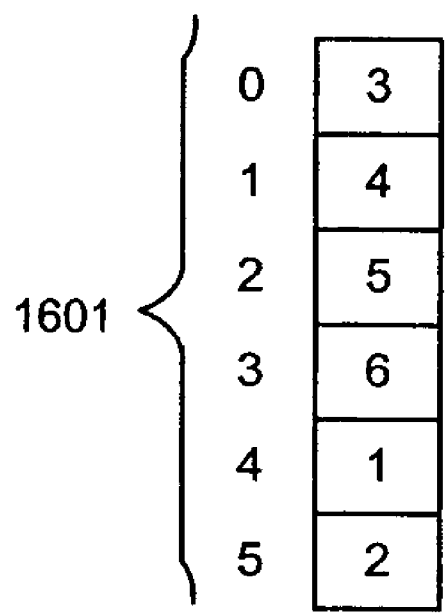

Such functionality will now be illustrated by way of example using FIG. 16. Shown in FIG. 16 is an exemplary ordered list holding, for each active node in a cluster, an identification number corresponding to that node. In various embodiments such an identifier may be associated with a node, for instance, upon its association with a cluster.

The exemplary list of FIG. 16 is held by the node associated with identification number 3. Accordingly, as is seen in FIG. 16, the list is ordered numerically according to the identification numbers of the active nodes, with the list shifted so the list element corresponding to the node holding the list (node associated with identification number 3) is at an extreme end of the list (in this case the list's first element) It is further noted that, in various embodiments, a sequential index number is associated with list element. For example, as shown in FIG. 16, the list elements are sequentially number by index numbers 1601.

In embodiments of the present invention where nodes in a cluster possess such ordered lists, a node wishing to dispatch data via intra-cluster distribution could act to dispatch the data to a number of nodes in its cluster selected from the list. The node could, for example, act to choose from the list N nodes corresponding to the list elements having the highest and lowest index numbers outside of the list entry corresponding to itself.

To illustrate by way of example, in the case where the value of N was 2, the node could act to select the nodes corresponding to identification numbers 4 and 2. These nodes would be chosen because they corresponded to the list elements having index numbers 1 and 5, two of the lowest and highest index numbers in the list outside of the index number corresponding to the node holding the list (index number 0).

To further illustrate by way of example, it is noted that, had N possessed a value of 4, the node would have acted to select the nodes corresponding to identification numbers 4, 5, 1, and 2. These nodes would have been chosen because they corresponded to the list elements having index numbers 1, 2, 4, and 5, four of the lowest and highest index numbers in the list outside of the index number corresponding to the node holding the list (index number 0). It is noted that, in various such embodiments, in the case where N is set to an odd number, the node could act to give preference to either highest or lowest index numbers.

To illustrate by way of example, turning again to FIG. 16, in the case where N had been set to the value of three, and preference was being given to highest index numbers, the node would have acted to select the nodes corresponding to identification numbers 4, 1, and 2. These nodes would have been chosen because these nodes correspond to the list elements having index numbers 1, 4, and 5, two of the highest index numbers and one of the lowest index numbers in the list outside of the index number corresponding to the node holding the list (index number 0). It is noted that preference having been given to highest index numbers in this example is evidenced by the N value of three being split in favor of high index numbers, with two high index numbers being chosen and one low index number being chosen.

It is noted that in the case where the total number of index numbers apart from the index number corresponding to a node holding the list is less than N, the node could, for instance, act to see N as being equal to total number of index numbers apart from the index number corresponding to itself. The above-described N value could be set in a number of ways. For example, the value could be chosen by a system administrator or the like.

Upon receipt of the dispatched data, each selected node could act to forward the received data to additional nodes in the cluster. The forwarding could, for instance, be performed in a manner analogous to that discussed above with respect to the node that initiated the data dispatch.

Accordingly each node selected by the node that initiated the data dispatch could, for example, possess an ordered list of the sort described above, with the list being shifted so that the list entry corresponding to itself was at an extreme end of the list. Moreover, each such node could, for example to, act to choose from its held list nodes corresponding to the list elements having the highest and lowest index numbers outside of the list entry corresponding to itself, and to forward the data to those nodes.

A node receiving the forwarded data from a node selected by the node that initiated the data dispatch, as well as each other node so receiving forwarded data, could act in a manner analogous to that discussed above to forward the data to one or more other nodes.

Dispatch of data between nodes in a cluster in implementing intra-cluster communications of the sort just described could, for example, be performed in a manner analogous to that discussed above with respect to a node contacting another node for purposes of registration. It is noted that, in various embodiments, a node initiating such intra-cluster distribution could choose a modifier that would be employed by itself and other nodes in the cluster in choosing target nodes to which to forward the data corresponding to the distribution.

In various embodiments, an indication of the modifier could be included along with the data as it is forwarded to various nodes in the cluster. The modifier could, for example, act to adjust a scheme in which N nodes corresponding to list elements having the highest and lowest index numbers outside of the list entry corresponding to a dispatching node were chosen.

For example, the modifier could be a numerical value that could act to shift choice away from such highest and lowest index numbers. For instance, where the modifier had the value X, the scheme could be adjusted such that N nodes be chosen from nodes corresponding to list elements having the $X^{th}$ highest and lowest index numbers outside of the list entry corresponding to the dispatching node.

To illustrate by way of example with respect to FIG. 16, where N was equal to 2 and the modifier was equal to 2, the node holding the list could act to dispatch data to the nodes corresponding to identification numbers 1 and 5. These nodes would be chosen because they corresponded to the list elements having index numbers 2 and 4, two of the second lowest and highest index numbers in the list outside of the index number corresponding to the node holding the list.

It is noted that, in various embodiments, a list of nodes to which data corresponding to such an intra-cluster distribution had been sent could be included with dispatch of the data, and a node receiving the data could act to ignore nodes that had already received the data in its selection of the nodes to which it would forward the data.

Such functionality could be implemented in a number of ways. For instance, the node initiating the data dispatch could append to the dispatched data an indication of the nodes to which it had dispatched the data. Each node receiving the data from the node that initiated dispatch could, before forwarding the data to one or more nodes that it had chosen, append to the list an indication of the chosen nodes.

Likewise, each node being forwarded the data from a node that had been forwarded the data could, before forwarding the data to one or more chosen nodes, append to the list an indication of the nodes that it had chosen.

Turning to inter-cluster distribution it is noted that, according to various embodiments, inter-cluster distribution may, for example, be performed in a manner where data is passed from cluster to cluster by the action of a node in each cluster, such that a node in each cluster receives the data from one other node in one other cluster, and passes it to another node in another cluster, perhaps with no cluster receiving the data more than once from another cluster.

Figure 17:
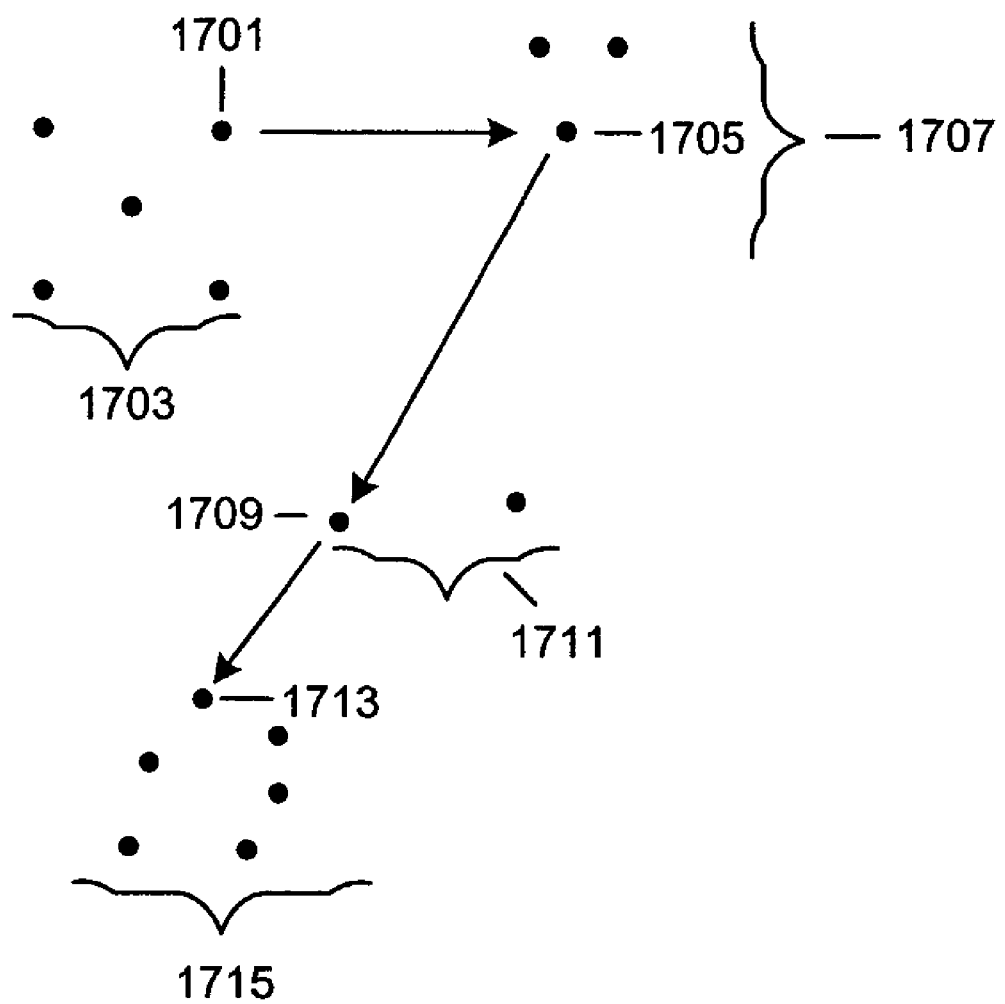
FIGS. 17-21 are diagrams depicting exemplary steps involved in inter-cluster distribution according to various embodiments of the present invention.

Shown in FIG. 17 is an exemplary depiction of such an inter-cluster distribution technique where data is passed from node 1701 in cluster 1703 to node 1705 in cluster 1707, from node 1705 in cluster 1707 to node 1709 in cluster 1711, and from node 1709 in cluster 1711 to 1713 in cluster 1715.

Such inter-cluster functionality could be implemented in a number of ways. For instance, in various embodiments associated with each cluster in the network environment could be a cluster identification number. Such a number might be associated with a cluster, for instance, upon its establishment. Such cluster identification numbers might, in various embodiments, be stored in the NI held by each node in the network environment.

Accordingly, among the data held in the NI for a particular node in the network environment in such embodiments could, for instance, be an identification number or the like corresponding to the node, a cluster identification number or the like corresponding to the cluster with which the node is associated, an indication of whether or not the node is deactivated, the node's network address, and/or the like.

In such embodiments, a node initiating dispatch of data to other clusters via inter-cluster distribution could choose a first active (i.e., not deactivated) node in another cluster to receive the data. In choosing the node in another cluster, the node initiating inter-cluster distribution could employ its held NI. The node initiating distribution could, for instance, choose from the NI an active node associated with a cluster having a cluster identification number most proximal to the cluster identification number of the cluster with which the node initiating distribution was associated.

In certain embodiments, the node initiating distribution might consider the numerical value of the cluster identification number with which it is associated, and choose an active node associated with a cluster having a cluster identification number greater in numerical value than that numerical value. In other embodiments the node initiating distribution might choose an active node associated with a cluster having a cluster identification number lower in numerical value than that numerical value.

Where there is more than one active node in the chosen cluster, various techniques may be employed in choosing the active node to receive the data. For example, the node initiating distribution might randomly choose one of the active nodes.

As another example, the node initiating distribution might keep a record of nodes that it has selected for inter-cluster communications, and employ that record in choosing from among the active nodes.

For instance, the node initiating distribution might preferentially select an active node that it has communicated with less in the past for inter-cluster communications over one that is has communicated with more in the past for inter-cluster communications.

It the case where the node initiating distribution determines that there is no cluster having an identification number appropriately proximal, the node might consider the cluster having the appropriately most extreme value to have the appropriately proximal value.

For instance, where the cluster identification numbers in a network environment 10, 30, and 50, and identification numbers with greater numerical values were to be chosen, where a node associated with the cluster having identification number 50 wished to perform such inter-cluster distribution, it could act to choose as a data recipient a node of the cluster associated with identification number 10, as there was no active node having an identification number greater than 50 and 10 was the appropriately most extreme value (i.e., the lowest value in the set of identification numbers).

In various embodiments, included in the dispatched data could be an indication as to whether the node initiating distribution chose, relative to the numerical value of the numerical identifier of its own cluster, a target cluster a cluster having an identification number of greater numerical value or lower numerical value. Alternately, a system administrator or the like might chose one of greater numerical value or lower numerical value for use by nodes in the network environment for such inter-cluster distribution.

The node initiating distribution could, in various embodiments, include along with the data an indication that the received data should be distributed via inter-cluster distribution, a cluster identification number or the like corresponding to the cluster with which it was associated, an indication as to whether identification numbers of greater or lower numerical value should be chosen, and/or the like.

The node initiating distribution could dispatch the data to the chosen recipient node in a number of ways. For instance, the data could be dispatched in a manner analogous to that discussed above with respect to a node contacting another node for purposes of registration. Upon receipt of the data, the chosen node could, in various embodiments, consult its NI to determine the cluster in which an active node should next receive the data, and the active node that should be chosen from among the active nodes in that cluster. Such functionality could, for example, be implemented in a manner analogous to that discussed above with respect to the node initiating distribution choosing a cluster and a recipient active node in that cluster.

In the case where the node chosen by the node initiating distribution determined that the next recipient cluster would be the cluster associated with the node that initiated the distribution, the chosen node could, in various embodiments, terminate the distribution with the understanding that all clusters in the network environment had received the data.

In the case where the node chosen by the node initiating distribution found that the next recipient cluster would not be the cluster associated with the node that that initiated the distribution, the chosen node could seek to dispatch the data to an active node in that cluster. Dispatch could be performed, for instance, in a manner analogous to that discussed above with respect to the node that initiated the distribution dispatching data to an active node in a chosen cluster.

Having received the data, the active node chosen among those in the cluster found to be the next recipient cluster could act in a manner analogous to that of the node that chose it to be the next recipient. Likewise, each other node so receiving the data could act in a similarly analogous manner.

Another example of such inter-cluster distribution where data is passed from cluster to cluster by the action of a node in each cluster will now be described wherein, for instance, a node in a first cluster receives data from an upstream neighbor node in a second cluster and passes it to a downstream neighbor node in a third cluster.

Figure 18:
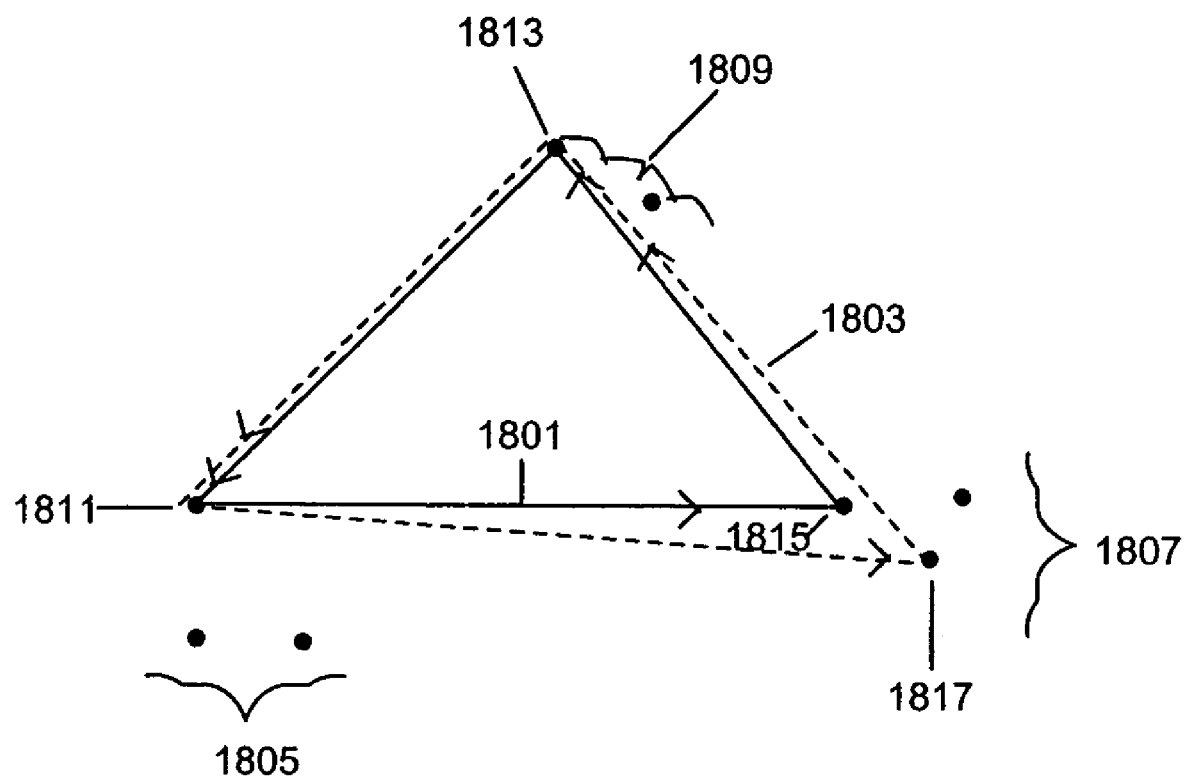

Shown in FIG. 18 is an exemplary view of various nodes and clusters in a network environment showing multiple established paths whereby data may be passed from cluster to cluster. As shown in FIG. 18, exemplary path 1801 allows data to be passed among clusters 1805, 1807, and 1809 by the action of node 1811 of cluster 1805 passing data to node 1815 of cluster 1807, node 1815 passing data to node 1813 of cluster 1809, and node 1813 passing data to node 1811.

For path 1801, 1811 may be described as having node 1813 as is upstream neighbor node and node 1815 as its downstream neighbor node, 1815 may be described as having node 1811 as its upstream neighbor node and node 1813 as its downstream neighbor node, and node 1813 may be described as having node 1815 as its upstream neighbor node and node 1811 as its downstream neighbor node.

As also shown in FIG. 18, exemplary path 1803 allows data to be passed among clusters 1805, 1807, and 1809 by the action of node 1811 of cluster 1805 passing data to node 1817 of cluster 1807, node 1817 passing data to node 1813 of cluster 1809, and node 1813 passing data to node 1811.

For this path, 1811 may be described as having node 1813 as is upstream neighbor node and node 1817 as its downstream neighbor node, 1817 may be described as having node 1811 as its upstream neighbor node and node 1813 as its downstream neighbor node, and node 1813 may be described as having node 1817 as its upstream neighbor node and node 1811 as its downstream neighbor node.

It is noted that, although two paths are shown in FIG. 18, in various embodiments a different number of paths may be established, or no paths may be established at all. It is further noted that, in various embodiments where there are multiple paths, an identification number may be associated with each path. Moreover, it is noted that, in various embodiments, in the case where, for example, there is only a single cluster in a network environment, a node in that single cluster might, for example, consider itself to be its upstream neighbor and consider itself to be its downstream neighbor.

As discussed above, in various embodiments a node becoming associated or reassociated with a cluster via registration, activation, reclustering, or the like could act to contact a node of that cluster. In various embodiments, the node becoming associated or reassociated might come to know of its neighbors by way of data dispatched by the contacted node.

In various embodiments, in the situation where the contacted node was not a member of a path involving at least one other node in a different cluster, the contacted node might act so that a node in the cluster that was a member of a path involving at least one other node in a different cluster could dispatch the data. It is noted that, in various embodiments, such a situation would not be expected to occur and/or such action would not be required.

The contacted node might know of such a node, for example, by dispatching data to the other nodes in its cluster requesting that all appropriate nodes reply. Such dispatch could, for example, be via an intra-cluster distribution technique. It is noted that, in various embodiments, such a step might not be performed in the case where there was no other cluster in the network environment and/or no other cluster having an active node. Such a determination could be made, for example by consulting the held NI.

Appropriate nodes in the cluster could dispatch responses to the contacted node. The data could be dispatched, for example, in a manner analogous to that discussed above with respect to a node contacting another node for purposes of registration. In the case where no affirmative responses were received, and/or where the dispatch was not performed, the contacted node could, in various embodiments, instruct the node becoming associated or reassociated with the cluster to consider itself to be its upstream and downstream neighbor. Such a situation might arise, for instance, where there was no other cluster in the network environment and/or no other cluster having an active node. In the case where affirmative responses are received, the contacted node could choose one of the responding nodes to dispatch the data regarding neighbor nodes.

Where there is more than one node to choose from, the contacted node could choose the node to dispatch the data in a number of ways. For example the contacted node could randomly choose one of the nodes. As another example, the contacted node could act to choose based on criteria specified, for example, by a network administrator or the like. Having chosen the node, the contacted node could, in various embodiments, provide it with appropriate information so that it could dispatch the data regarding neighbor nodes.

A contacted node (or, in various embodiments, a node chosen by a contacted node) could act to provide the node that contacted the contacted node with information regarding its upstream neighbor and/or downstream neighbor. The contacted node or node chosen by the contacted node could act to choose the neighbors in a number of ways.

For instance, in various embodiments it could choose its upstream neighbor in a path of which it was an element to be the upstream neighbor of the node that contacted the contacted node, and/or it could choose its downstream neighbor in a path of which it was an element to be the downstream neighbor of the node that contacted the contacted node.

Through such action a new path could be created which, relative to the path from which the upstream and downstream neighbors were drawn, differed by having the path element that was occupied by the contacted node or node chosen by the contacted node instead being occupied by the node that contacted the contacted node.

To illustrate by way of example, suppose with regard to FIG. 18. that 1815 was the contacted node or node chosen by the contacted node, and that the node 1817 was the node that contacted the contacted node. Further suppose that only path 1801 exists, with node 1815 being associated with the path by having node 1811 of cluster 1805 as its upstream neighbor and node 1813 of cluster 1809 as its downstream neighbor. In accordance with the above-described behavior, node 1815 could act to create new path 1807 wherein, relative to path 1801, node 1817 would be taking the place of node 1815.

Having chosen the upstream and/or downstream neighbors for the node that contacted the contacted node, the contacted node or node chosen by the contacted node could further act to establish an identification number corresponding to the newly created path. Moreover, the contacted node or node chosen by the contacted node could act to inform the members of the newly created path of the path's creation. Accordingly, the contacted node or node chosen by the contacted node could act to dispatch to one or more members of the new path, including perhaps the node that contacted the contacted node, appropriate information.

Among the appropriate information dispatched to a particular member node could, for example, be the identification number corresponding to the new path, and indication of its upstream neighbor in the new path, and/or indication of its downstream neighbor in the path. Included could, for instance, be a network address and/or the like corresponding to the upstream neighbor and/or a network address or the like corresponding to the downstream neighbor.

Such dispatch could be performed in a number of ways. For example, data could be dispatched in a manner analogous to that discussed above with respect to a node contacting another node for purposes of registration. It is noted that, in various embodiments, no action may be taken to create a new path. For example, there might be a specification, provided by a system administrator or the like, of the number of paths that should that should be maintained in the system, and a new path might not be created in the case where doing so would result in there being more paths than the specified number.

In various embodiments, in the case where a node associated with a path involving at least one other node in a different cluster ceases to be associated with and/or ceases to be an active node with respect to its cluster (e.g., via deregistration, deactivation, and/or reclustering), various operations could be performed. For instance, in various embodiments the node ceasing to be associated with and/or ceasing to be an active node with respect to its cluster could act to find a node (e.g., a node in its cluster) to replace its role in one or more of the paths with which it was involved.

Upon choosing such a node, the node ceasing to be associated with and/or ceasing to be an active node with respect to its cluster could act to, in a manner analogous to that discussed above with respect to creation of a new path, dispatch appropriate data to the chosen node and/or other nodes in a path such as, for instance, an indication of upstream neighbor, an indication of downstream neighbor, an indication of the identifier associated with the path, and/or the like. The node might, for instance, employ its held NI in choosing a node in its cluster to replace its role in a particular path. In various embodiments, the choice might be made in accordance with specifications provided by a system administrator or the like.

It is noted that, in various embodiments, the node ceasing to be associated with and/or ceasing to be an active node with respect to its cluster might not act to perform such operations with respect to one of more of the paths with which it was associated. For example, there might be a specification, provided by a system administrator or the like, of the number of paths that should that should be maintained in the system. Accordingly, the node might not act to maintain more paths than the specified number. Thus, for instance, one or more paths might come to cease to exist.

It is noted that, in various embodiments, a node becoming associated or reassociated with a cluster might find itself to be the only node and/or the only active node in that cluster. In various such embodiments, various operations might be performed to allow the node to become a member of a path. For example, the node might act to employ its NI to contact an active node in another cluster in the network environment. The node could then act to dispatch a request to become a path member to the chosen node.

In various embodiments, in the case where the recipient node was not a member of a path and/or was not a member of a path involving at least one other node in a cluster other than its own, it could act to forward the request to a member of its cluster that was a path member for handling by that node. Such functionality could, for instance, be implemented in a manner analogous to that discussed above.

As a next step, the contacted node in the other cluster or the node chosen by the contacted node could act to provide the node that dispatched the request to become a path member with information regarding its upstream neighbor, downstream neighbor, and/or the identification number corresponding to the path with which it was being associated.

The contacted node in the other cluster or the node chosen by the contacted node could choose the neighbors in a number of ways. For example, in various embodiments it could choose its upstream neighbor in a path of which it was an element to be the upstream neighbor of the node that dispatched the request and/or could choose itself to be the downstream neighbor of the node that dispatched the request. Through such action, the path could be expanded to further include access to the cluster associated with the node that dispatched the request by way of that node.

Having chosen the upstream and/or downstream neighbors for the node that dispatched the request, the contacted node in the other cluster or the node chosen by the contacted node could act to inform the members of the path of the changes. Accordingly, the node could act make itself and one or more members of the path, including perhaps the node that contacted the contacted node, aware of appropriate information.

Among the appropriate information dispatched to a particular member node could, for example, be the identification number of the path, indication of its upstream neighbor in the path, and/or indication of its downstream neighbor in the path. Included could, for instance, be a network address and/or the like corresponding to the upstream neighbor and/or a network address or the like corresponding to the downstream neighbor. Such dispatch could be performed in a number of ways. For example, data could be dispatched in a manner analogous to that discussed above with respect to a node contacting another node for purposes of registration.

It is noted that, in various embodiments, in the case where there was no node in another cluster that was a member of a path involving at least one other node, the node seeking to become a path member could do so via the action of a node in another cluster that considered itself to be its upstream neighbor and its downstream neighbor. Such a situation might arise, for example, where there had been only one cluster in the network environment, and then a new cluster was formed which had only the node seeking to become a path member.

In such embodiments, the node in another cluster could, for example, act in a manner analogous to that discussed above, choosing its upstream neighbor in a path of which it was an element to be the upstream neighbor of the node seeking to become a path member and/or choosing itself to be the downstream neighbor of the node seeking to become a path member. Moreover the node could, if required, select an identification number for the path and make the node seeking to become a path member aware of it. It is noted that, under such circumstances, the "upstream neighbor" of the node in another cluster would be itself. Accordingly, a path would be created allowing for the passing of data between the cluster of the node seeking to become a path member and the other cluster.

Figure 19:
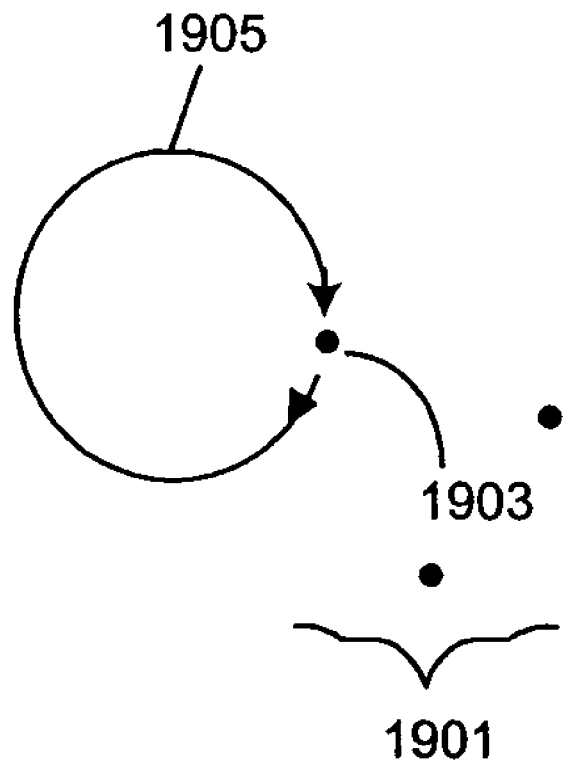
Figure 20:
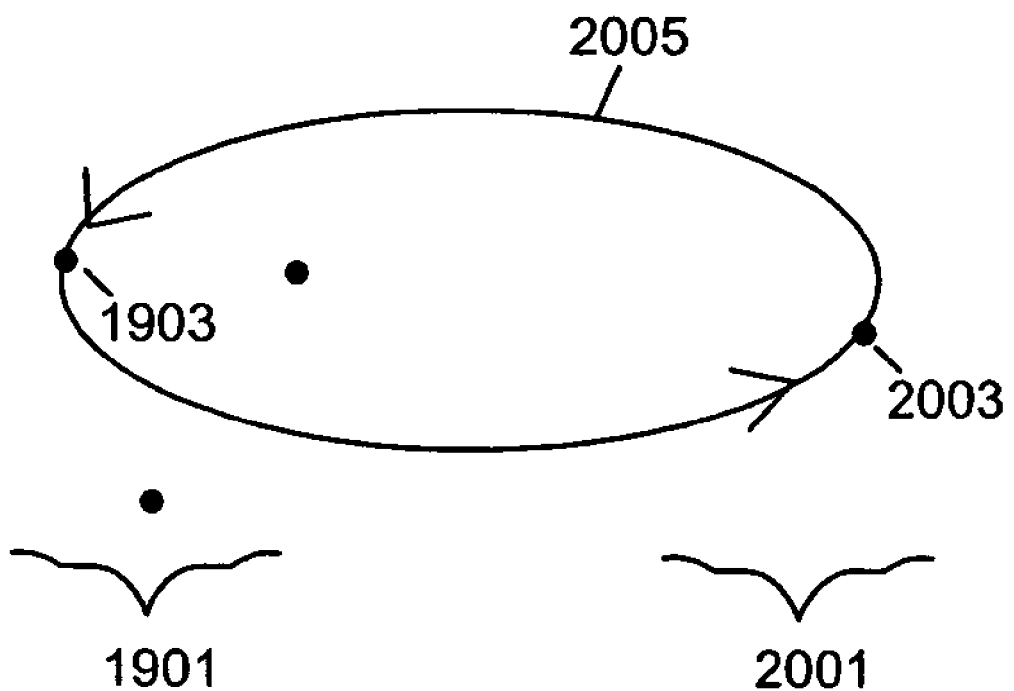

Such functionality will now be described by way of example with respect to FIGS. 19 and 20. Shown in FIG. 19 is node 1903 of cluster 1901. As is seen in FIG. 19, node 1903 considers itself to be its downstream and upstream neighbor in path 1905. Depicted in FIG. 20 is an exemplary result of node 1903 acting with respect to node 2003 in the manner just discussed. As a result of the operations, node 2003 comes to be the upstream and downstream neighbor of node 1903, node 1903 comes to be the upstream and downstream neighbor of node 2003, and path 2005 comes to provide for inter-cluster dispatch between the two clusters 1901 and 2001.

It is noted that, in various embodiments, in the case where operations of the sort described above found no active node that was a member of a path and/or that was a member of a path involving at least one other node in a cluster other than its own the node that dispatched the request to become a path member could act to construct a path connecting each cluster possessing an active node.

Such functionality could be implemented in a number of ways. For example, the node could consult its NI to select as a member in the new path an active node in each cluster other than its own in the network environment. Moreover, the node could select itself to be the node path member corresponding to its own cluster.

The node could further act to appropriately arrange itself and the selected nodes as upstream and downstream neighbors of one another so to yield a configuration of the sort described above. The node could further act to establish an identifier for the new path. Moreover, the node could act to dispatch to each selected node an indication of its upstream neighbor, of its downstream neighbor, and/or of the identifier corresponding to the new path. Such dispatch could, for example, be performed in a manner analogous to that discussed above.

In embodiments of the present invention as discussed above where established paths allow for inter-cluster distribution, a node wishing to dispatch data via inter-cluster distribution could perform a number of steps to initiate such distribution. For example, in the case where the node initiating distribution is a member of more than one path, the node could choose one of the paths to employ in the inter-cluster distribution.

Such choice could be made in a number of ways. For example, the node initiating distribution might randomly choose one of the paths. As another example, the node might keep track of the paths it uses, and preferentially choose a path it has used less frequently and/or less recently over a path it as used more frequently and/or more recently. Having chosen a path, or where it is only associated with one path, the node could act to pass the data to be distributed to its downstream neighbor.

The node initiating distribution could, for example, direct the data to a network address or the like associated with its downstream neighbor. The network address or the like could be known by the node initiating distribution, for example, via consultation of its NI and/or via information received at the time it learned of its downstream neighbor. Included with the data could, for example, be an indication of the identifier corresponding to the path to be employed for the distribution. Also included with the data could be an indication of itself (i.e., the node that initiated distribution).

Upon receipt of the data, the node receiving the data from the node that initiated distribution could act, perhaps in an analogous manner, to forward the data to its downstream node. It is noted that, in various embodiments, such forwarding might not be performed in the case where it was determined that the downstream node was the node that initiated distribution. Such a determination might be made, for instance, by the node the received the data from the node that initiated distribution.

Where the node that received the data from the node that initiated distribution passed the data to its downstream node, the downstream node could act in a manner analogous to that of the node that received the data from the node that initiated distribution. Likewise, each other node so receiving the data could act in a similarly analogous manner.

To illustrate by way of example, turning again to FIG. 18, via such functionality node 1811 could choose to dispatch data via path 1801, and the data could, in turn, be passed from node 1811 to node 1815, and from node 1815 to node 1813.

As another example of inter-cluster distribution, in various embodiments distribution may be performed in a manner where data is passed from a node in a cluster directly to an active node in each other cluster in the network environment.

Figure 21:
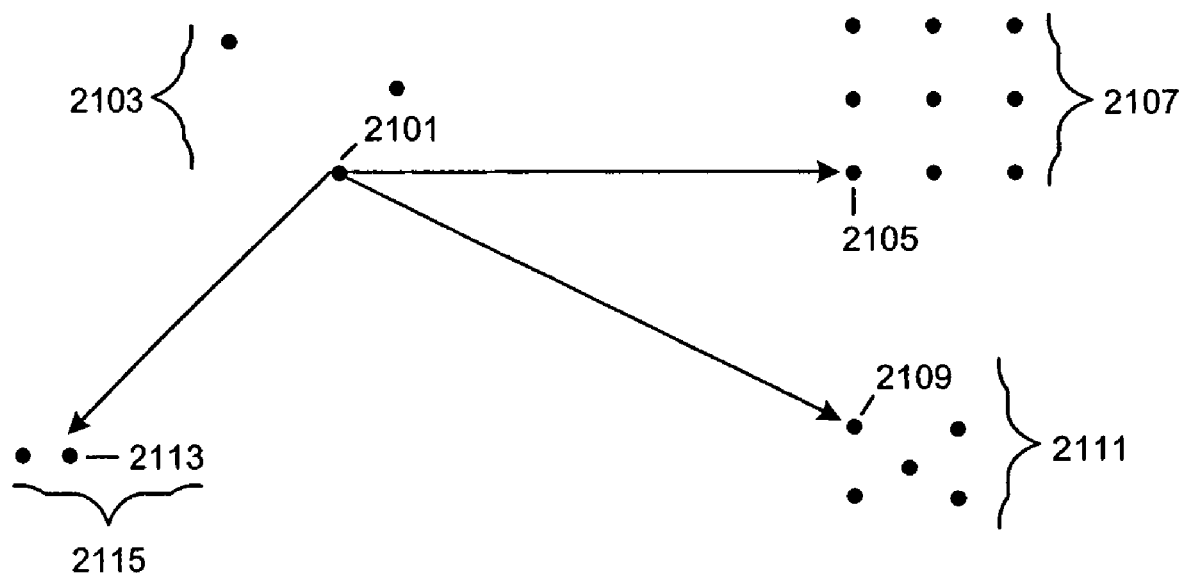

Shown in FIG. 21 is an exemplary depiction of such an inter-cluster distribution technique wherein data is passed from node 2101 in cluster 2103 directly to each of node 2105 in cluster 2107, node 2109 in cluster 2111, and node 2113 in cluster 2115.

Such inter-cluster distribution functionality could be implemented in a number of ways. For instance, in various embodiments stored in the NI held by each node in the network environment could be, for each node in the network environment, an indication of the cluster with which the node is associated, a network address or the like corresponding to the node, and/or an indication of whether or not the node is deactivated.

Accordingly, a node seeking to dispatch data to an active node in each cluster of the network environment via this inter-cluster distribution technique could, for example, consult its NI in choosing an active node in each cluster in the network environment as a recipient of the data, and perhaps in learning the network address or the like of the chosen node.

In the case where there was more than one active node in a cluster, various techniques could be employed in choosing the active node to receive the data. For example, the node initiating the inter-cluster distribution might randomly choose one of the active nodes in the cluster. As another example, the node initiating the inter-cluster distribution might keep a record of nodes that it has selected for inter-cluster communications, and employ that record in choosing from among the active nodes.

For instance, the node initiating the inter-cluster distribution might preferentially select an active node that it has communicated with less frequently and/or less recently for inter-cluster communications over one that is has communicated with more frequently and/or more recently for inter-cluster communications.

Having so consulted the NI, the node initiating the inter-cluster distribution could act to dispatch the data to each chosen node. Such dispatch could be performed in a number of ways. For example, the data could be dispatched in a manner analogous to that discussed above with respect to a node contacting another node for purposes of registration.

It is noted that, in various embodiments, in the case where a cluster did not have an active node, a node seeking to dispatch data via such inter-cluster distribution might not attempt to dispatch data to that cluster. In various embodiments, nodes later activating with respect to the cluster could learn of the data that was dispatched via the inter-cluster distribution. Such would be the case, for instance, where the inter-cluster distribution was employed for NI update.

It is further noted that, in various embodiments, inter-cluster dispatch could be performed in a manner where distribution, rather than being to all clusters, is to specified clusters and/or to a specified number of clusters. Such functionality could, for example, be implemented in a manner similar to that discussed with respect to FIG. 21, but with nodes, in a manner perhaps analogous to that discussed above with respect to intra-cluster distribution, possessing ordered lists of clusters.

Hardware and Software

Certain operations and the like described herein may be executed by and/or with the help of computers. Further, the nodes described herein may be and/or may incorporate computers. The phrases "computer", "general purpose computer", and the like, as used herein, refer but are not limited to a processor card smart card, a media device, a personal computer, an engineering workstation, a PC, a Macintosh, a PDA, a computerized watch, a node, a wired or wireless terminal, a server, a network access point, a network multicast point, or the like, perhaps running an operating system such as OS X, Linux, Darwin, Windows CE, Windows XP, Windows Server 2003, Palm OS, Symbian OS, or the like, perhaps employing the Series 60 Platform, and perhaps having support for Java and/or .Net.

Figure 22:
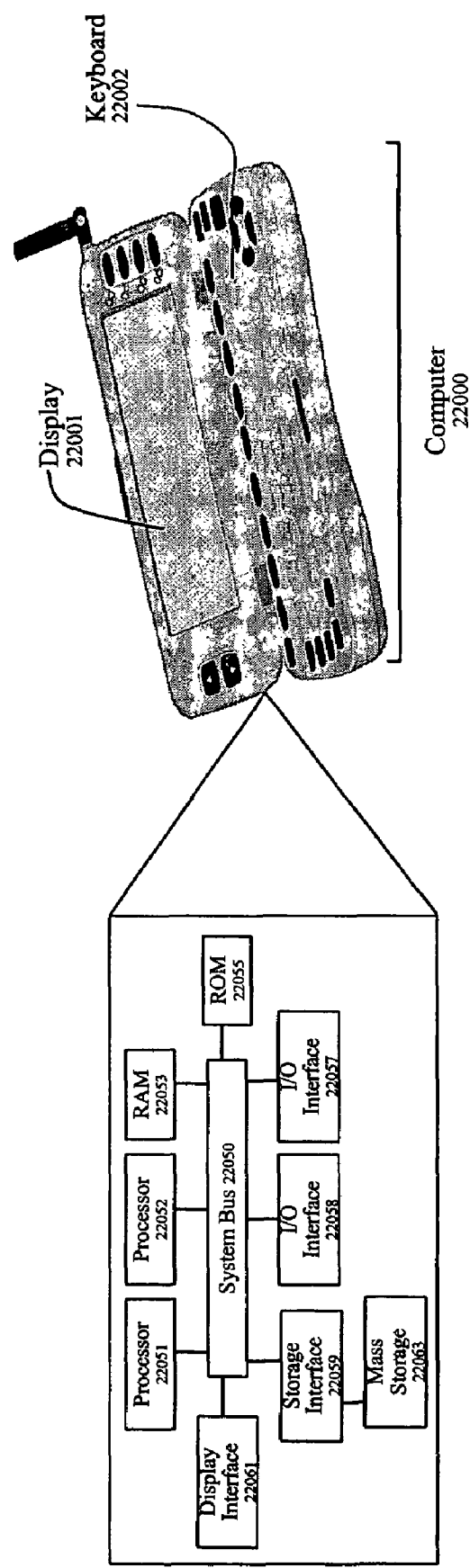
FIG. 22 shows an exemplary general purpose computer employable in various embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 22000 as shown in FIG. 22 includes system bus 22050 which operatively connects two processors 22051 and 22052, random access memory 22053, read-only memory 22055, input output (I/O) interfaces 22057 and 22058, storage interface 22059, and display interface 22061. Storage interface 22059 in turn connects to mass storage 22063. Each of I/O interfaces 22057 and 22058 may be an Ethernet, IEEE 1394, IEEE 1394b, IEEE 802.11a, IEEE 802.11b, IEEE 802.11g, IEEE 802.16a, IEEE 802.20, IEEE 802.15.3, Zig-Bee, Bluetooth, terrestrial digital video broadcast (DVB-T), satellite digital video broadcast (DVB-S), digital audio broadcast (DAB), general packet radio service (GPRS), Universal Mobile Telecommunications Service (UMTS), DVB-X, IrDA (Infrared Data Association), or other interface known in the art.

Mass storage 22063 may be a hard drive, optical drive, or the like. Processors 22057 and 22058 may each be a commonly known processor such as an IBM or Motorola PowerPC, an AMD Athlon, an AMD Opteron, an Intel ARM, an Intel XScale, a Transmeta Crusoe, an Intel Xenon, or an Intel Pentium. Computer 22000 as shown in this example also includes a touch screen 22001 and a keyboard 22002. In various embodiments, a mouse, keypad, and/or interface might alternately or additionally be employed. Computer 22000 may additionally include or be attached to card readers, DVD drives, floppy disk drives, and/or the like whereby media containing program code may be inserted for the purpose of loading the code onto the computer.

In accordance with the present invention, a computer may run one or more software modules designed to perform one or more of the above-described operations. Such modules might, for example, be programmed using languages such as Java, Objective C, C, C#, and/or C++ according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, grid computing techniques may be employed.

Figure 23:
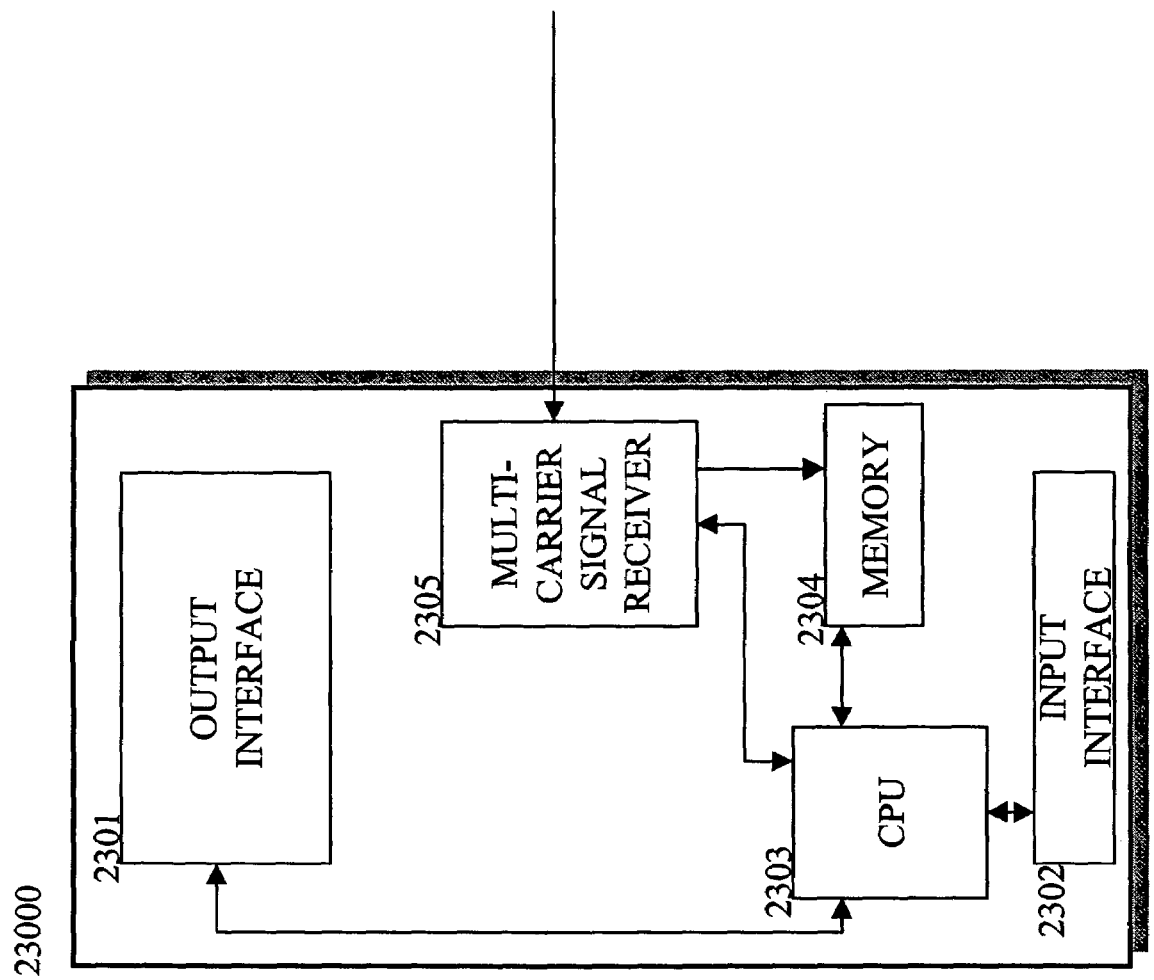
FIG. 23 shows a functional block diagram of an exemplary node employable in various embodiments of the present invention.

Shown in FIG. 23 is a functional block diagram of an exemplary terminal employable in various embodiments of the present invention. The terminal of FIG. 23 has been discussed in the foregoing. In the following, corresponding reference signs have been applied to corresponding parts. Terminal 23000 of FIG. 23 may be used in any/all of the embodiments described herein. The terminal 23000 comprises a processing unit CPU 2303, a multi-carrier signal terminal part 2305 and a user interface (2301, 2302). The multi-carrier signal terminal part 2305 and the user interface (2301, 2302) are coupled with the processing unit CPU 2303. One or more direct memory access (DMA) channels may exist between multi-carrier signal terminal part 2305 and memory 2304. The user interface (2301, 2302) comprises a display and a keyboard to enable a user to use the terminal 23000. In addition, the user interface (2301, 2302) comprises a microphone and a speaker for receiving and producing audio signals. The user interface (2301, 2302) may also comprise voice recognition (not shown).

The processing unit CPU 2303 comprises a microprocessor (not shown), memory 2304 and possibly software. The software can be stored in the memory 2304. The microprocessor controls, on the basis of the software, the operation of the terminal 23000, such as the receiving of the data stream, the tolerance of the impulse burst noise in the data reception, displaying output in the user interface and the reading of inputs received from the user interface. The operations are described above. The hardware contains circuitry for detecting the signal, circuitry for demodulation, circuitry for detecting the impulse, circuitry for blanking those samples of the symbol where significant amount of impulse noise is present, circuitry for calculating estimates, and circuitry for performing the corrections of the corrupted data.

Still referring to FIG. 23, alternatively, middleware or software implementation can be applied. The terminal 23000 can be a hand-held device which the user can comfortably carry. Advantageously, the terminal 23000 can be a cellular mobile phone which comprises the multi-carrier signal terminal part 2305 for receiving the multicast transmission stream. Therefore, the terminal 23000 may possibly interact with the service providers.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method for cluster management in a network environment, comprising:
   receiving a request from a node to change affiliation with said network environment;
   determining if the affiliation change would result in an integer-squared number of nodes being affiliated with said environment; and dispatching data to realize reclustering in said environment in the case where said determining yields an affirmative result.

2. The method of claim 1, wherein said network environment is a peer-to-peer environment.

3. The method of claim 1, wherein it is determined if the affiliation change would result in said integer-squared number of nodes being registered in said network environment.

4. The method of claim 1, wherein it is determined if the affiliation change would result in said integer-squared number of nodes being active in said network environment.

5. The method of claim 1, wherein the affiliation change is registration.

6. The method of claim 1, wherein the affiliation change is entry into active state.

7. The method of claim 1, wherein said reclustering comprises establishment of a new cluster in said network environment.

8. The method of claim 1, wherein said reclustering comprises elimination of an existing cluster in said network environment.

9. The method of claim 1, wherein said reclustering comprises transfer of one or more nodes from a first cluster in said network environment to a second cluster in said network environment.

10. A system for cluster management in a network environment, comprising:
   a memory having program code stored therein; and
   a processor operatively connected to said memory for carrying out instructions in accordance with said stored program code;
   wherein said program code, when executed by said processor, causes said processor to perform:
      receiving a request from a node to change affiliation with said network environment;
      determining if the affiliation change would result in an integer-squared number of nodes being affiliated with said environment; and
      dispatching data to realize reclustering in said environment in the case where said determining yields an affirmative result.

11. The system of claim 10, wherein said network environment is a peer-to-peer environment.

12. The system of claim 10, wherein it is determined if the affiliation change would result in said integer-squared number of nodes being registered in said network environment.

13. The system of claim 10, wherein it is determined if the affiliation change would result in said integer-squared number of nodes being active in said network environment.

14. The system of claim 10, wherein the affiliation change is registration.

15. The system of claim 10, wherein the affiliation change is entry into active state.

16. The system of claim 10, wherein said reclustering comprises establishment of a new cluster in said network environment.

17. The system of claim 10, wherein said reclustering comprises elimination of an existing cluster in said network environment.

18. The system of claim 10, wherein said reclustering comprises transfer of one or more nodes from a first cluster in said network environment to a second cluster in said network environment.

* * * * *